US 6,747,760 B2

(12) United States Patent
Silverbrook et al.

(10) Patent No.: US 6,747,760 B2
(45) Date of Patent: Jun. 8, 2004

(54) PRINT ENGINE CONTROLLER FOR A MULTI-SEGMENT PRINTHEAD

(75) Inventors: Kia Silverbrook, Balmain (AU); Paul Lapstun, Balmain (AU); Simon Robert Walmsley, Balmain (AU)

(73) Assignee: Silverbrook Research Pty Ltd., Balmain (AU)

( * ) Notice: Subject to any disclaimer, the term of this patent is extended or adjusted under 35 U.S.C. 154(b) by 203 days.

(21) Appl. No.: 10/173,739

(22) Filed: Jun. 19, 2002

(65) Prior Publication Data

US 2003/0072036 A1 Apr. 17, 2003

Related U.S. Application Data

(63) Continuation of application No. 09/575,108, filed on May 23, 2000.

(51) Int. Cl.$^7$ .................... H04N 1/405; H04N 1/409
(52) U.S. Cl. .................... 358/3.13; 358/3.26; 358/1.8
(58) Field of Search .................... 358/3.13, 3.14, 358/1.8, 1.9, 3.26, 3.06, 535, 534, 502, 504, 406, 466; 347/19, 42, 3, 5, 14, 15; 382/270

(56) References Cited

U.S. PATENT DOCUMENTS

| 4,809,063 | A | 2/1989 | Moriguchi et al. |
| 5,121,343 | A | 6/1992 | Faris |
| 5,160,945 | A | 11/1992 | Drake |
| 5,265,315 | A | 11/1993 | Hoisington et al. |
| 5,587,730 | A | 12/1996 | Karz |
| 5,604,527 | A | 2/1997 | Ng et al. |
| 5,706,105 | A | 1/1998 | Naylor, Jr. |
| 5,754,193 | A | 5/1998 | Elhatem |
| 5,805,178 | A | 9/1998 | Silverbrook |
| 5,854,882 | A | 12/1998 | Wang |
| 5,867,183 | A | 2/1999 | Cornell et al. |
| 5,909,227 | A | 6/1999 | Silverbrook |
| 5,914,737 | A | 6/1999 | Silverbrook |
| 5,971,518 | A | 10/1999 | Bolash et al. |
| 6,074,112 | A | 6/2000 | Desie et al. |
| 6,102,510 | A | 8/2000 | Kikuta et al. |
| 6,139,125 | A | 10/2000 | Otsuka et al. |
| 6,149,259 | A | 11/2000 | Otsuka et al. |
| 6,161,916 | A | 12/2000 | Gibson et al. |
| 6,243,111 | B1 | 6/2001 | Imanaka et al. |
| 6,394,573 | B1 * | 5/2002 | Lapstun et al. ............... 347/19 |
| 6,464,332 | B1 * | 10/2002 | Silverbrook et al. .......... 347/42 |

FOREIGN PATENT DOCUMENTS

| EP | 0 034 060 A1 | 8/1981 | |
| EP | 0 390 202 A2 | 10/1990 | |
| EP | 0 842 777 A2 | 5/1998 | |
| EP | 0 849 087 A1 | 6/1998 | |
| EP | 0 835 025 A2 | 8/1998 | |
| EP | 0 960 737 A2 | 12/1999 | |
| WO | WO 95/06911 | 3/1995 | |
| WO | WO02/02339 A1 * | 1/2002 | ............. B41J/2/21 |

* cited by examiner

Primary Examiner—Scott Rogers

(57) ABSTRACT

An inkjet printer comprises a printhead that includes a number of printhead segments that span a print area so that portions of consecutive printhead segments overlap in common print areas. Each printhead segment defines a lead-in area in one common print area and a lead-out area in a consecutive common print area. An interface is configured to receive image data. A memory device stores data relating to characteristics of the printhead. A dithering unit communicates with the interface and the memory device. The dithering unit is configured to generate a lead-in dither matrix associated with the lead-in area and a lead-out dither matrix associated with the lead-out area, to generate lead-in/lead-out dither matrices for each common print area, to generate a variable probability value that is dependent on a scalar value that corresponds to a position along a line spanning each common print area and to interpolate the lead-in/lead-out dither matrices with the variable probability value. A compositor communicates with the dithering unit to composite the data into print data. A printhead interface communicates with the compositor to receive the print data and to provide the printhead with the print data.

7 Claims, 14 Drawing Sheets

PRINT ENGINE CONTROLLER FOR A MULTI-SEGMENT PRINTHEAD

This is a continuation application of U.S. Ser. No. 09/575,108 field on May 23, 2000

FIELD OF THE INVENTION

The invention relates to a print engine controller for a multi-segment print head and in particular to the application of suitable dither matrices to achieve suitable transition between consecutive printhead segments.

BACKGROUND OF THE INVENTION

A range of printer types have evolved wherein an image is constructed from ink selectively applied to a page in dot format. In U.S. Pat. No. 6,045,710, incorporated herein by reference, titled 'Self-aligned construction and manufacturing process for monolithic printheads' to the inventor Kia Silverbrook there is set out an assessment of the prior art to drop on demand printers along with its manufacturing process.

Various methods, systems and apparatus relating to the present invention are disclosed in the following co-pending United States patent applications filed by the applicant or assignee of the present invention on May 23rd 2000 and which are all incorporated by reference:

| | | |
|---|---|---|
| 09/575,197 (NPA001US), | 09/575,195 (NPA002US), | 09/575,159 (NPA004US), |
| 09/575,132 (NPA005US), | 09/575,123 (NPA006US), | 09/575,148 (NPA007US), |
| 09/575,130 (NPA008US), | 09/575,165 (NPA009US), | 09/575,153 (NPA010US), |
| 09/575,118 (NPA012US), | 09/575,131 (NPA016US), | 09/575,116 (NPA017US) |
| 09/575,144 (NPA018US), | 09/575,139 (NPA019US), | 09/575,186 (NPA020US), |
| 09/575,185 (NPA021US), | 09/575,191 (NPA030US), | 09/575,145 (NPA035US), |
| 09/575,192 (NPA048US), | 09/575,181 (NPA075US), | 09/575,193 (NPB001US), |
| 09/575,156 (NPB002US), | 09/575,183 (NPK002US), | 09/575,160 (NPK003US), |
| 09/575,150 (NPK004US), | 09/575,169 (NPK005US), | 09/575,184 (NPM001US), |
| 09/575,128 (NPM002US), | 09/575,180 (NPM003US), | 09/575,149 (NPM004US), |
| 09/575,179 (NPN001US), | 09/575,133 (NPP005US), | 09/575,143 (NPP006US), |
| 09/575,187 (NPP001US), | 09/575,155 (NPP003US), | 09/575,196 (NPP007US), |
| 09/575,198 (NPP008US), | 09/575178 (NPP016US), | 09/575,164 (NPP017US), |
| 09/575,146 (NPP018US), | 09/575,174 (NPS001US), | 09/575,163 (NPS003US), |
| 09/575,168 (NPS020US), | 09/575,154 (NPT001US), | 09/575,129 (NPT002US), |
| 09/575,124 (NPT003US), | 09/575,188 (NPT004US), | 09/575,189 (NPX001US), |
| 09/575,162 (NPX003US), | 09/575,172 (NPX008US), | 09/575,170 (NPX011US), |
| 09/575,171 (NPX014US), | 09/575,161 (NPX016US), | 09/575,141 (IJ52US), |
| 09/575,125 (IJM52US), | 09/575,142 (MJ10US), | 09/575,140 (MJ11US), |
| 09/575,190 (MJ12US), | 09/575,138 (MJ13US), | 09/575,126 (MJ14US), |
| 09/575,127 (MJ15US), | 09/575,158 (MJ34US), | 09/575,117 (MJ47US), |
| 09/575,147 (MJ58US), | 09/575,152 (MJ62US), | 09/575,176 (MJ63US), |
| 09/575,115 (PAK04US), | 09/575,114 (PAK05US), | 09/575,113 (PAK06US), |
| 09/575112 (PAK07US), | 09/575,111 (PAK08US), | 09/575,108 (PEC01US), |
| 09/575,109 (PEC02US), | 09/575,110 (PEC03US) | |

In addition, various methods, systems and apparatus relating to the present invention are disclosed in the following co-pending United States patent applications filed simultaneously by the applicant or assignee of the present invention: Ser. No. 09/607,985 (PEC04US), Ser. No. 09/607,990 (PEC05US), Ser. 09/606,999 (PEC07US).

The disclosures of these co-pending applications are incorporated herein by cross-reference.

Of particular note are co-pending U.S. patent applications Ser. No. 09/575,152 (MJ62US), Ser. No. 09/575,141 (IJ52US), Ser. No. 09/575,125 (IJM52US), Ser. No. 09/575,176 (MJ63US), Ser. No. 09/575,147 (MJ58US), incorporated herein by reference, which describe a micro-electromechanical drop on demand printhead hereafter referred to as a Memjet printhead.

The Memjet printhead is developed from printhead segments that are capable of producing, for example, 1600 dpi bi-level dots of liquid ink across the full width of a page. Dots are easily produced in isolation, allowing dispersed-dot dithering to be exploited to its fullest. Color planes might be printed in perfect registration, allowing ideal dot-on-dot printing. The printhead enables high-speed printing using micro-electromechanical ink drop technology.

In addition, co-pending U.S. patent applications Ser. No. 09/575,108 (PEC01US), Ser. No. 09/575,109 (PEC02US), Ser. No. 09/575,110 (PEC03US), Ser. No. 09/607,985 (PEC04US), Ser. No. 09/607,990 (PEC05US) and Ser. No. 09/606,999 (PEC07US), incorporated by reference, describe a print engine/controller suited to driving the Memjet printhead.

The print engine/controller used to drive the printhead puts received print data to the printhead nozzles. It is known to apply dither to the data.

Of particular note is Ser. No. 09/607,985 (PEC04US), which describes print engine/controller adaptations useful to interface multiple print engine/controller chips to a multi-segment printhead. It can be referred to for particular detail of the print engine/controller to which the dither process, and characterization vector, can be added.

In a multi-segment printhead such as the above there is a problem with maintaining average dot gain and brightness over an overlapping pair of printhead segments and this is made worse by misalignment of segments. There is need of a dither process that takes account of these problems.

Furthermore, the human eye tends to amplify differences between visual characteristics at a zone or region where such differences occur. This amplification is known as mach banding. Such mach banding would tend to occur at a point of overlap between two print segments. Thus, a further need of the dither process is to reduce or eliminate this problem of mach banding so that a user is not aware of any transition between two printhead segments.

SUMMARY OF THE INVENTION

According to a first aspect of the invention, there is provided a method of controlling a print engine for a multi-segment printhead having a plurality of printhead segments that are positioned in a printhead to span a print area so that portions of consecutive printhead segments overlap in common print areas, with each printhead segment defining a lead-in area in one common print area and a lead-out area in a consecutive common print area, the method comprising the steps of:

generating a set of dither matrices for each printhead segment, each set having at least a lead-in dither matrix associated with the lead-in area and a lead-out dither matrix associated with the lead-out area;

generating lead-in/lead-out dither matrices for each common print area based on characteristics of the printhead segments of each common print area;

generating a variable probability value that is dependent on a scalar value that corresponds to a position along a line spanning each common print area;

interpolating the lead-in/lead-out dither matrices with the variable probability value to generate interpolated lead-in/lead-out dither matrices;

loading a compositor with the data representing the matrices;

compositing print data based on the dither matrices; and providing the printhead with the print data.

The method may include the steps of:

querying the printhead segments to generate data in the form of a characterization vector that is unique to the printhead;

loading a memory device with the characterization vector; and reading the characterization vector to carry out the step of generating the lead-in/lead-out dither matrices.

The method may include the step of generating a dither matrix for a non-overlapping portion of each printhead segment.

According to a second aspect of the invention, there is provided a print engine controller for a multi-segment printhead having a plurality of printhead segments that are positioned in a printhead to span a print area so that portions of consecutive printhead segments overlap in common print areas, with each printhead segment defining a lead-in area in one common print area and a lead-out area in a consecutive common print area, the print engine controller comprising an interface which is configured to receive image data;

a memory device that is capable of storing data relating to characteristics of the multi-segment printhead;

a dithering unit that communicates with the interface to receive the image data from the interface and the memory device to receive data relating to the characteristics of the multi-segment printhead, the dithering unit being configured to generate a set of dither matrices for each printhead segment so that each set has at least a lead-in dither matrix associated with the lead-in area and a lead-out dither matrix associated with the lead-out area, to generate lead-in/lead-out dither matrices for each common print area based on characteristics of the printhead segments of each common print area, to generate a variable probability value that is dependent on a scalar value that corresponds to a position along a line spanning each common print area and to interpolate the lead-in/lead-out dither matrices with the variable probability value to generate interpolated lead-in/lead-out dither matrices;

a compositor that communicates with the dithering unit to receive data representing the interpolated lead-in/lead-out dither matrices and to composite the data into print data; and a printhead interface that communicates with the compositor to receive the print data, the printhead interface being in communication with the multi-segment printhead to provide the multi-segment printhead with the print data.

The dithering unit may be configured to generate a dither matrix for each non-overlapping area of the printhead segments.

According to a third aspect of the invention, there is provided an inkjet printer that comprises a printhead that includes a number of printhead segments that span a print area, the printhead segments being positioned so that portions of consecutive printhead segments overlap in common print areas, with each printhead segment defining a lead-in area in one common print area and a lead-out area in a consecutive common print area;

an interface which is configured to receive image data;

a memory device that is capable of storing data relating to characteristics of the printhead;

a dithering unit that communicates with the interface to receive the image data from the interface and the memory device to receive data relating to the characteristics of the printhead, the dithering unit being configured to generate a set of dither matrices for each printhead segment so that each set has at least a lead-in dither matrix associated with the lead-in area and a lead-out dither matrix associated with the lead-out area, to generate lead-in/lead-out dither matrices for each common print area based on characteristics of the printhead segments of each common print area, to generate a variable probability value that is dependent on a scalar value that corresponds to a position along a line spanning each common print area and to interpolate the lead-in/lead-out dither matrices with the variable probability value to generate interpolated lead-in/lead-out dither matrices;

a compositor that communicates with the dithering unit to receive data representing the interpolated lead-in/lead-out dither matrices and to composite the data into print data; and a printhead interface that communicates with the compositor to receive the print data, the printhead interface being in communication with the printhead to provide the printhead with the print data.

Each common print area defined by consecutive printhead segments may have a width of at least 1 mm.

For each set of two overlapping segments the overlap is characterized in terms of a misalignment. That misalignment is used to generate lead-in lead-out dither matrices and an offset into the standard third dither matrix. The lead-in lead-out dither matrices are used in conjunction over the overlap area. One can be a fadeout and the other is then a fade-in dither matrix. They are generated so that the combination of the two dither matrices gives a constant dot gain over the overlap area.

The offset is required to locate where in the third dither matrix to go to once the fade-in is finished. The third dither matrix might be thought of as the standard dither matrix, and the other two matrices as providing a cross-fade. Of the other two, one dither matrix fades out, and the other fades in.

Because of misalignment, it is not appropriate to simply continue straight on into the standard dither matrix once you have passed the overlap. Instead it may be necessary to go to a different column of the standard dither matrix, depending on misalignment.

Thus, there are preferably at least three dither matrices. A standard one that is common across all segments for the non-overlapping bits, and a pair of dither matrices per overlap. One fades out from the common dither matrix, and the other fades into the common dither matrix. Misalignment information can be obtained from a characterization vector stored on each printhead segment. The characterization vector can also store dead nozzle data. Contone CMYK layers are composited using a dither matrix selected by a dither matrix select map. The dithered contone layer has appropriate Netpage tag data added together with the black layer over the contone layer. The composite is sent to the multi-segment printhead. The datastream is adjusted to create smooth transitions across overlapping segments and it can compensate for dead nozzles in the printhead by reference to a printhead characterization vector. The resolution of the dither matrix select map should ideally match the contone resolution.

Each printhead segment can be queried via its low speed serial bus to return a characterization vector of respective segments. The characterization vectors from multiple printhead chips can be combined to construct a nozzle defect list for the entire multi-segment printhead and allows the print engine to compensate for defective nozzles during the print. As long as the number of defective nozzles is low, the compensation can produce results indistinguishable from those of a printhead with no defective nozzles.

DETAILED DESCRIPTION OF THE PREFERRED EMBODIMENTS

A typically 12-inch printhead width is controlled by one or more PEC's, as described below, to allow full-bleed printing of both A4 and Letter pages. Six channels of colored ink are the expected maximum in the present printing environment, these being:

CMY, for regular color printing.

K, for black text and other black printing.

IR (infrared), for tag-enabled applications.

F (fixative), to enable printing at high speed.

A PEC might be built in a single chip to interface with a printhead. It will contain four basic levels of functionality:

receiving compressed pages via a serial interface such as IEEE 1394 a print engine for producing a page from a compressed form. The print engine functionality includes expanding the page image, dithering the contone layer, compositing the black layer over the contone layer, optionally adding infrared tags, and sending the resultant image to the printhead.

a print controller for controlling the printhead and stepper motors.

two standard low-speed serial ports for communication with the two QA chips. Note that there must be two ports and not a single port to ensure strong security during the authentication procedure.

Because of the page-width nature of the Memjet printhead, each page must be printed at a constant speed to avoid creating visible artifacts. This means that the printing speed can't be varied to match the input data rate. Document rasterization and document printing are therefore decoupled to ensure the printhead has a constant supply of data. A page is not printed until it is fully rasterized. This can be achieved by storing a compressed version of each rasterized page image in memory. This decoupling also allows the RIP(s) to run ahead of the printer when rasterizing simple pages, buying time to rasterize more complex pages.

Because contone color images are reproduced by stochastic dithering, but black text and line graphics are reproduced directly using dots, the compressed page image format contains a separate foreground bi-level black layer and background contone color layer. The black layer is composited over the contone layer after the contone layer is dithered (although the contone layer has an optional black component). A final layer of Netpage tags (in infrared or black ink) is optionally added to the page for printout.

The RIP software/hardware rasterizes each page description and compresses the rasterized page image. Each compressed page image is transferred to memory. Dither matrix selection regions in the page description are rasterized to a contone-resolution bi-level bitmap which is losslessly compressed to negligible size and which forms part of the compressed page image. The infrared (IR) layer of the printed page optionally contains encoded Netpage tags at a programmable density.

Figure 1:
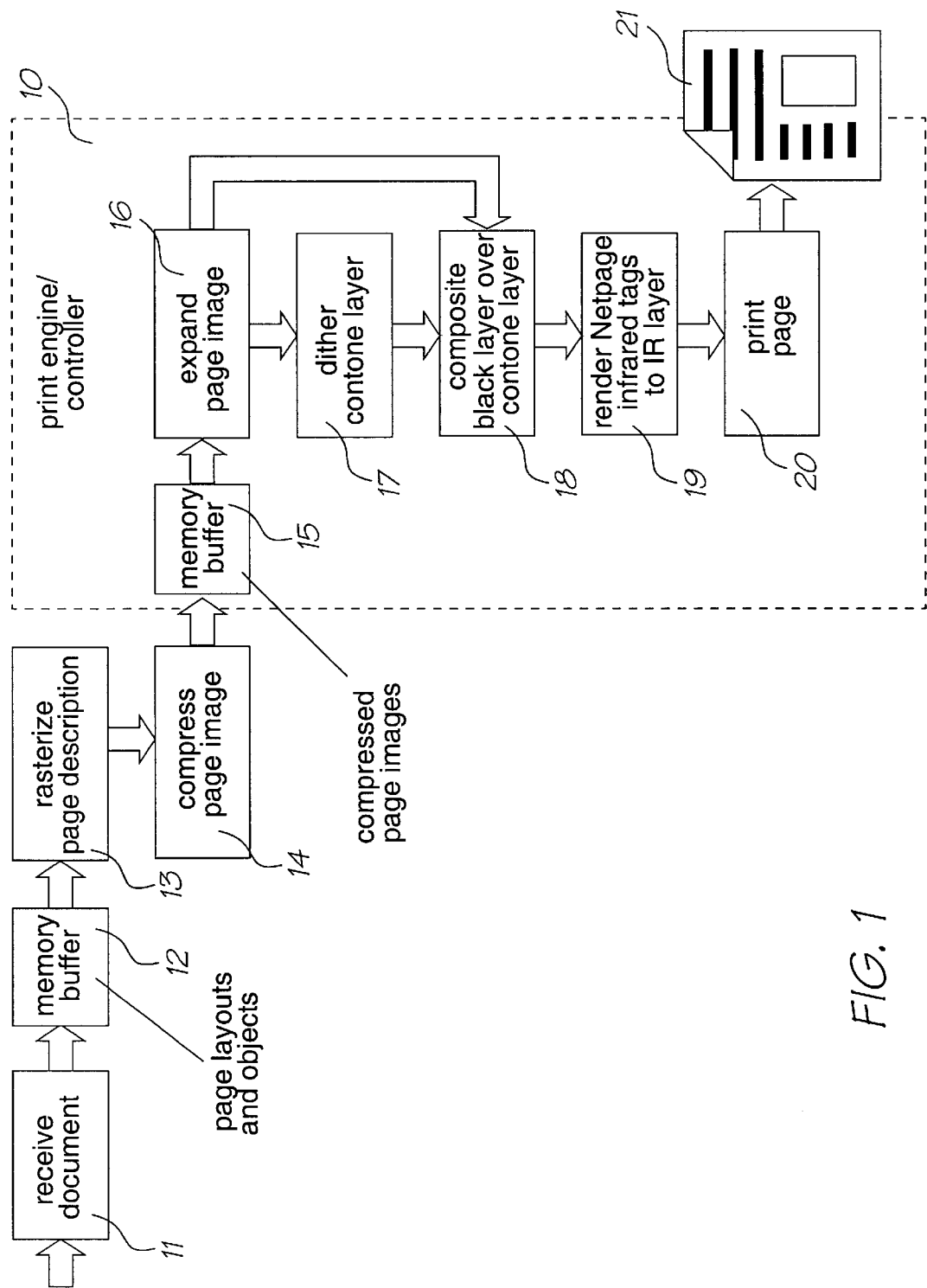
FIG. 1 is a diagram illustrating data flow and the functions performed by a print engine controller suited to driving a multi-segment print head.

In FIG. 1 a document is received at 11 and loaded to memory buffer 12 wherein page layouts may be affected and any required objects might be added. Pages from memory 12 are rasterized at 13 and compressed at 14 prior to transmission to the print engine controller 10. Pages are received as compressed page images within the print engine controller 10 into a memory buffer 15, from which they are fed to a page expander 16 wherein page images are retrieved. Any requisite dither might be applied to any contone layer at 17. Any black bi-level layer might be composited over the contone layer at 18 together with any infrared tags at 19. The composited page data is printed at 20 to produce page 21.

The first stage of the pipeline expands a JPEG-compressed contone CMYK layer (see below), expands a Group 4 Fax-compressed bi-level dither matrix selection map (see below), and expands a Group 4 Fax-compressed bi-level black layer (see below), all in parallel. In parallel with this, the tag encoder encodes bi-level IR tag data from the compressed page image. The second stage dithers the contone CMYK layer using a dither matrix selected by the dither matrix select map, composites the bi-level black layer over the resulting bi-level K layer and adds the IR layer to the page. A fixative layer is also generated at each dot position wherever there is a need in any of C, M, Y, K, or IR channels. The last stage prints the bi-level CMYK+IR data through the printhead via a printhead interface (see below).

Figure 2:
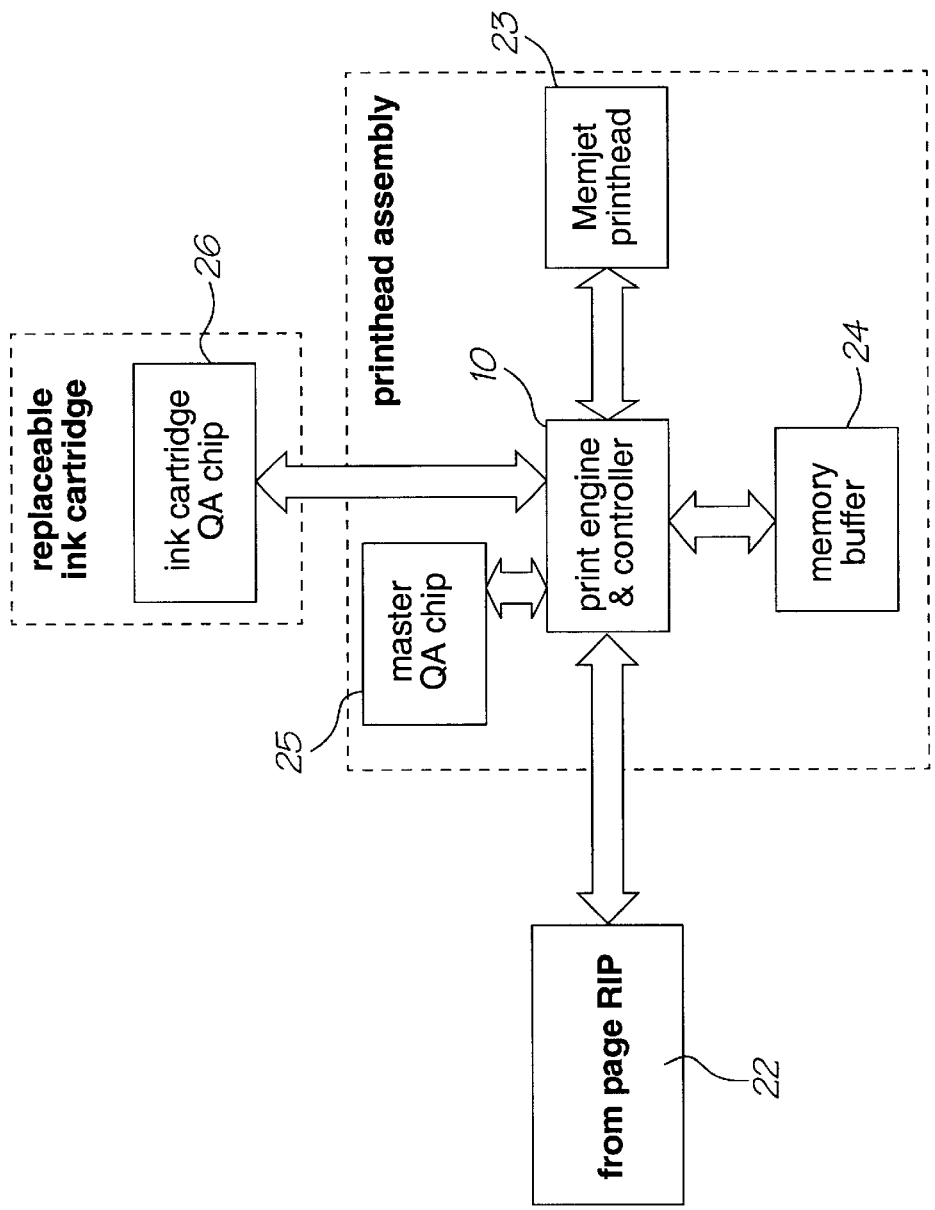
FIG. 2 shows the print engine controller in the context of the overall printer system architecture.

In FIG. 2 is seen how the print engine/controller 10 fits within the overall printer system architecture. The various components of the printer system might include a Print Engine/Controller (PEC). A PEC chip 10, or chips, is responsible for receiving the compressed page images for storage in a memory buffer 24, performing the page expansion, black layer compositing and sending the dot data to the printhead 23. It may also communicate with QA chips 25,26 and provides a means of retrieving printhead characteristics to ensure optimum printing. The PEC is the subject of this specification.

a memory buffer. The memory buffer 24 is for storing the compressed page image and for scratch use during the printing of a given page. The construction and working of memory buffers is known to those skilled in the art and a range of standard chips and techniques for their use might be utilized in use of the PEC of the invention.

a master QA chip. The master chip 25 is matched to replaceable ink cartridge QA chips 26. The construction and working of QA units is known to those skilled in the art and a range of known QA processes might be utilized in use of the PEC of the invention. For example, a QA chip is described in co-pending United States Patent Applications, all of which are incorporated by reference:

| USSN | Our Docket Number | Our Title |
| --- | --- | --- |
| TBA | AUTH01 | Validation Protocol and System |
| 09/112,763 | AUTH02 | Circuit for Protecting Chips Against IDD Fluctuation Attacks |
| 09/112,737 | AUTH04 | Method for Protecting On-Chip Memory (Flash and RAM) |
| 09/112,761 | AUTH05 | Method for Making a Chip Tamper-Resistant |
| 09/113,223 | AUTH06 | A system for authenticating physical objects |
| TBA | AUTH07 | Validation Protocol and System |
| TBA | AUTH08 | Validation Protocol and System |
| 09/505,003 | AUTH09 | Consumable Authentication Protocol and System |
| 09/517,608 | AUTH10 | Consumable Authentication Protocol and System |
| 09/505,147 | AUTH11 | Consumable Authentication Protocol and System |
| 09/505,952 | AUTH12 | Unauthorized Modification of Values Stored in Flash Memory |
| TBA | AUTH13 | A System for the Manipulation of Secure Data |
| 09/516,874 | AUTH14 | An Authentication Chip with Protection from Power Supply Attacks |
| TBA | AUTH15 | Shielding Manipulations of Secret Data |

QA chip communication may be best included within the overall functionality of the PEC chip since it has a role in the expansion of the image as well as running the physical printhead. By locating QA chip communication there it can be ensured that there is enough ink to print the page. Preferably the QA embedded in the printhead assembly is implemented using an authentication chip. Since it is a master QA chip, it only contains authentication keys, and does not contain user-data. However, it must match the ink cartridge's QA chip. The QA chip in the ink cartridge contains information required for maintaining the best possible print quality, and is implemented using an authentication chip.

Preferably a PEC chip will incorporate a simple microcontroller CPU core 35 to perform the following functions:

Perform QA chip authentication protocols via serial interface 36 between print pages Run the stepper motor via a parallel interface 91 during a print (the stepper motor requires a 5 KHz process)

Synchronize the various portions of the PEC chip during a print

Provide a means of interfacing with external data requests (programming registers etc.)

Provide a means of interfacing with printhead segment low-speed data requests (such as reading the characterization vectors and writing pulse profiles)

Provide a means of writing the portrait and landscape tag structures to external DRAM.

Figure 3:
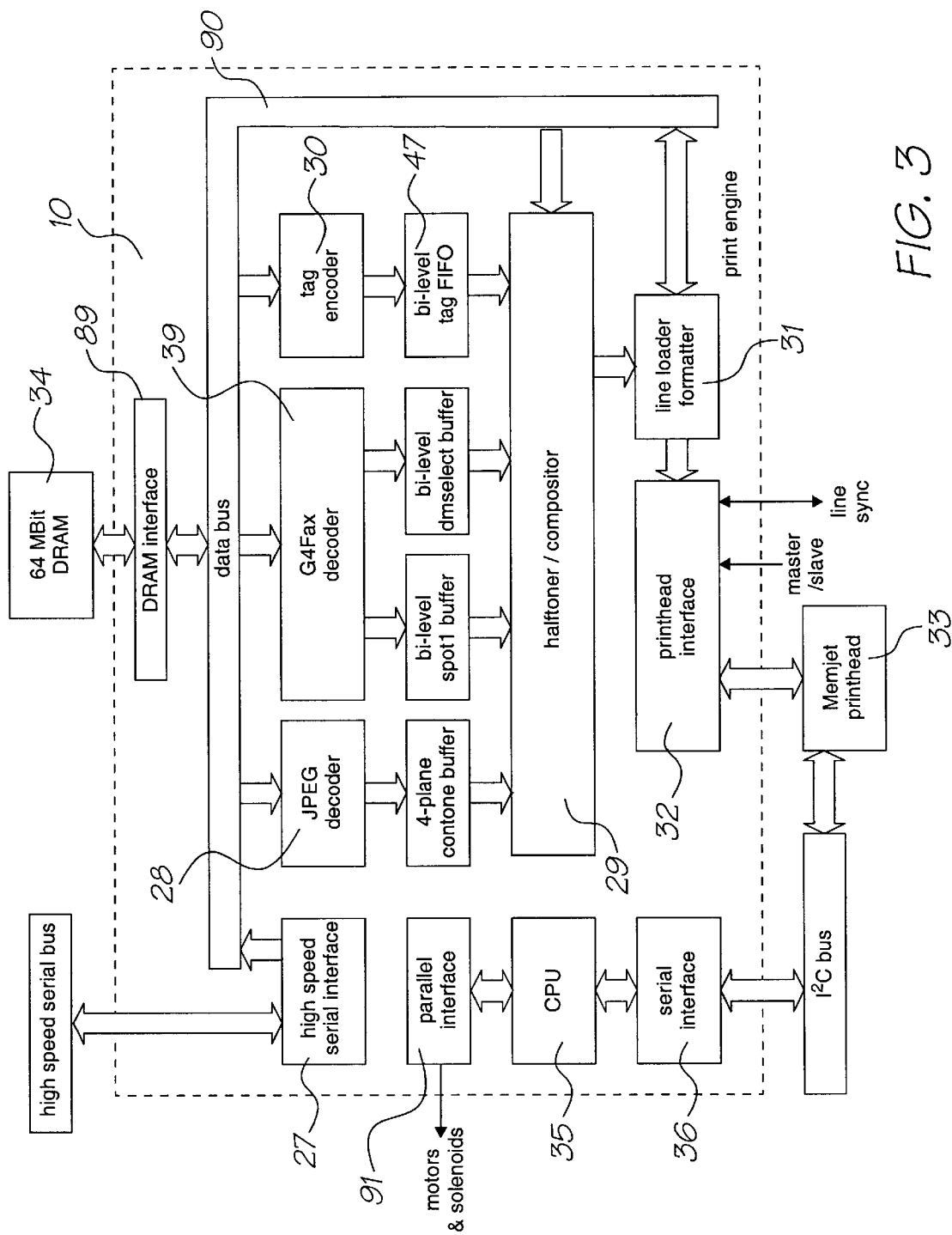
FIG. 3 illustrates the print engine controller architecture.

In FIG. 3 is seen the print engine architecture. The print engine's page expansion and printing pipeline consists of a high speed serial interface 27 (such as a standard IEEE 1394 interface), a standard JPEG decoder 28, a standard Group 4 Fax decoder 39, a custom halftoner/compositor unit 29, a custom tag encoder 30, a line loader/formatter unit 31, and a printhead interface 32 to the printhead 33. The decoders 28, 39 and encoder 30 are buffered to the halftoner/compositor 29. The tag encoder 30 establishes an infrared tag or tags to a page according to protocols dependent on what uses might be made of the page and the actual content of a tag is not the subject of the present invention.

The print engine works in a double-buffered way. One page is loaded into DRAM 34 via DRAM interface 89 and data bus 90 from the high-speed serial interface 27 while the previously loaded page is read from DRAM 34 and passed through the print engine pipeline. Once the page has finished printing, then the page just loaded becomes the page being printed, and a new page is loaded via the high-speed serial interface 27. At the first stage the pipeline expands any JPEG-compressed contone (CMYK) layer, and expands any of two Group 4 Fax-compressed bi-level data streams. The two streams are the black layer (although the PEC is actually color agnostic and this bi-level layer can be directed to any of the output inks), and a matte for selecting between dither matrices for contone dithering (see below). At the second stage, in parallel with the first, is encoded any tags for later rendering in either IR or black ink. Finally the third stage dithers the contone layer, and composites position tags and the bi-level spot1 layer over the resulting bi-level dithered layer. The data stream is ideally adjusted to create smooth transitions across overlapping segments in the printhead and ideally it is adjusted to compensate for dead nozzles in the printhead. Up to 6 channels of bi-level data are produced from this stage. Note that not all of the 6 channels may be present on the printhead. For example, the printhead may be CMY only, with K pushed into the CMY channels and IR ignored. Alternatively, the position tags may be printed in K if IR ink is not available (or for testing purposes). The resultant bi-level CMYK-IR dot-data is buffered and formatted for printing on the printhead 33 via a set of line buffers (see below). The majority of these line buffers might be ideally stored on the off-chip DRAM 34. The final stage prints the 6 channels of bi-level dot data via the printhead interface 32.

Figure 4:
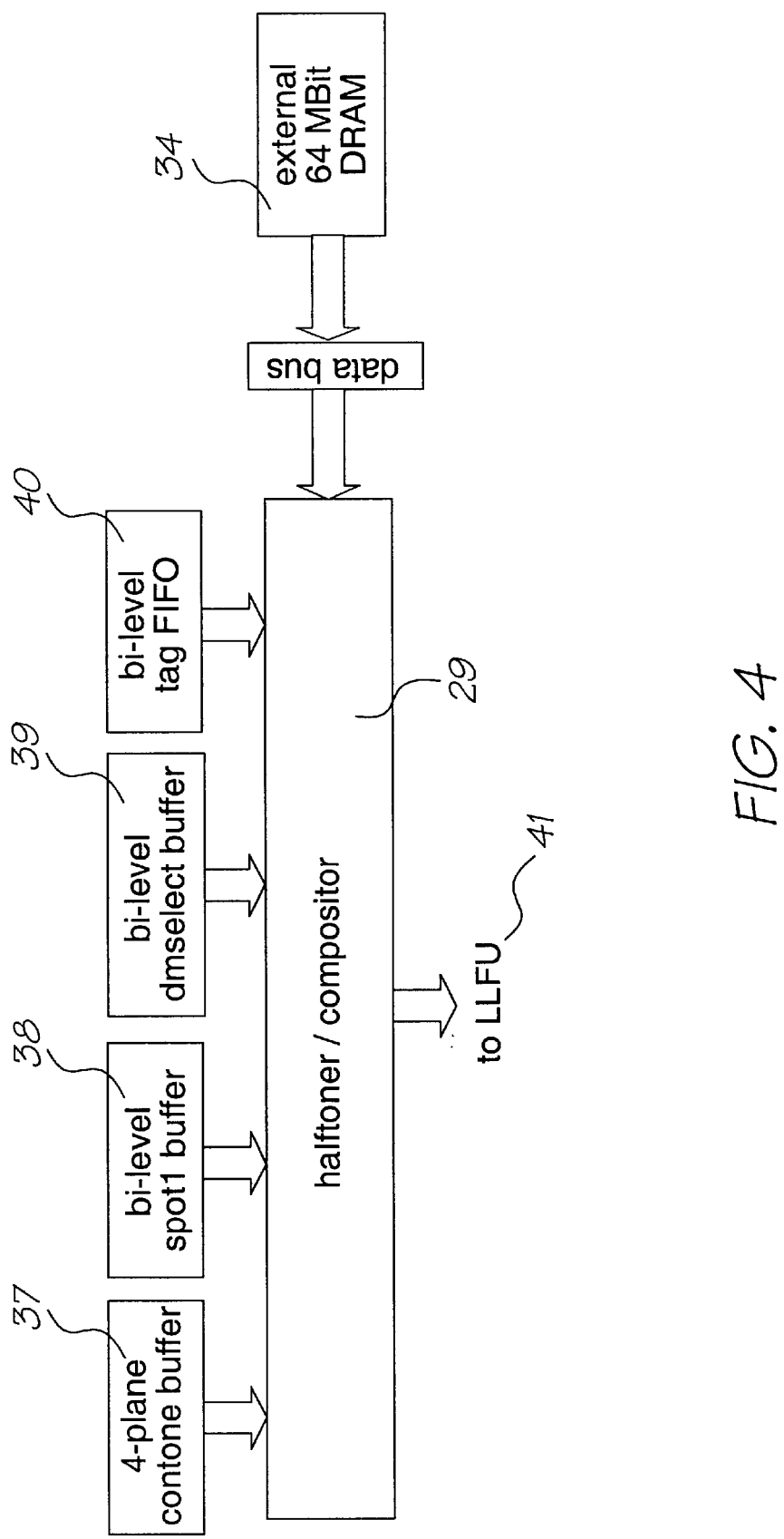
FIG. 4 illustrates the external interfaces to the halftoner/compositor unit (HCU) of FIG. 3.

In FIG. 4 the halftoner/compositor unit (HCU) 29 combines the functions of halftoning the contone (typically CMYK) layer to a bi-level version of the same, and compositing the spot1 bi-level layer over the appropriate half-toned contone layer(s). If there is no K ink in the printer, the HCU 29 is able to map K to CMY dots as appropriate. It also selects between two dither matrices on a pixel-by-pixel basis, based on the corresponding value in the dither matrix select map. The input to the HCU 29 is an expanded contone layer (from the JPEG decoder unit) through buffer 37, an expanded bi-level spot1 layer through buffer 38, an expanded dither-matrix-select bit-map at typically the same resolution as the contone layer through buffer 39, and tag data at full dot resolution through buffer 40. The HCU 29 uses up to two dither matrices, read from the external DRAM 34. The output from the HCU 29 to the line loader/format unit (LLFU) at 41 is a set of printer resolution bi-level image lines in up to 6 color planes. Typically, the contone layer is CMYK or CMY, and the bi-level spot1 layer is K.

Figure 5:
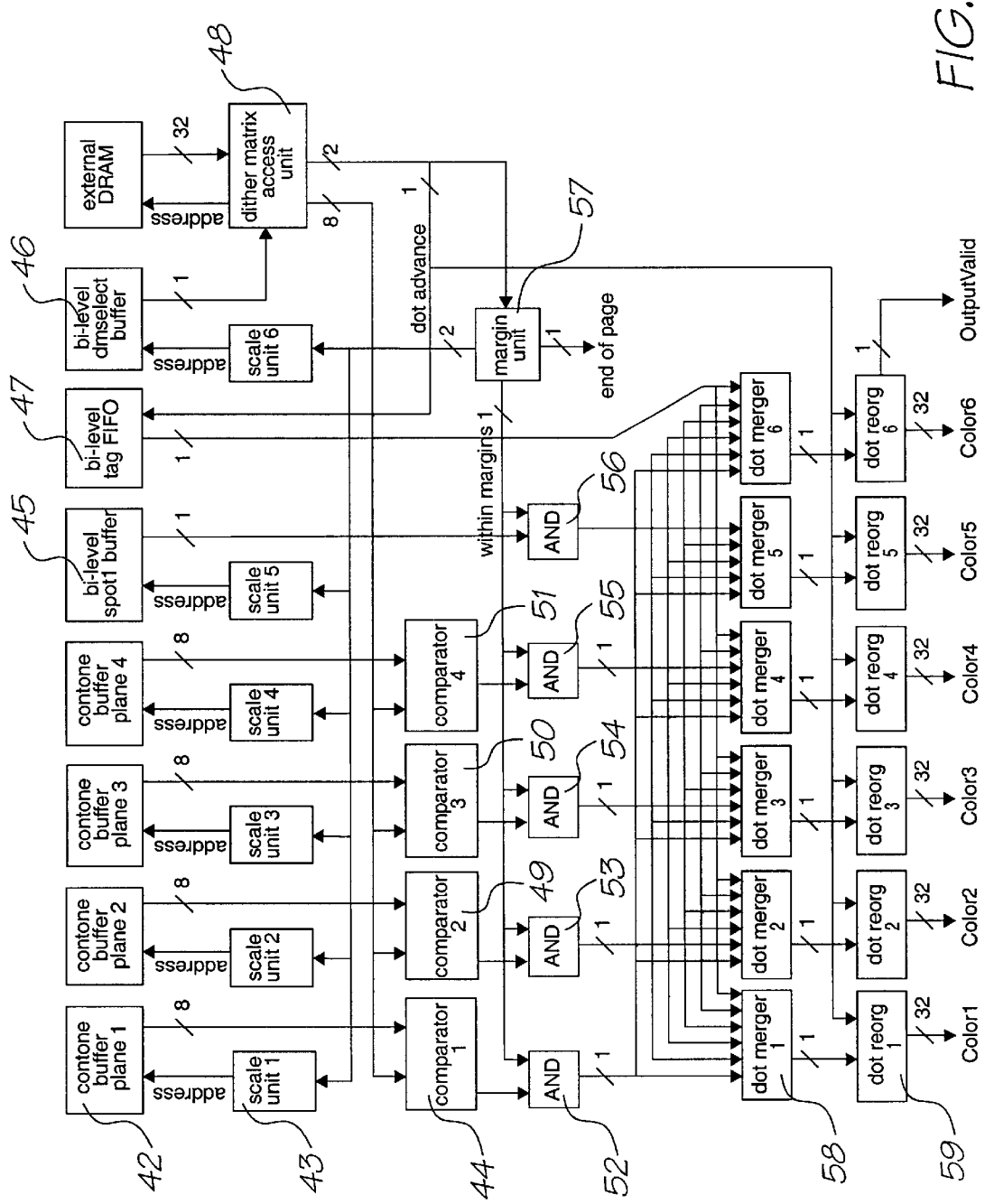
FIG. 5 is a diagram showing internal circuitry to the HCU of FIG. 4.

In FIG. 5 is seen the HCU 29 in greater detail. Once started, the HCU 29 proceeds until it detects an end-of-page condition, or until it is explicitly stopped via its control register. The first task of the HCU is to scale, in the respective scale, units such as the scale unit 43, all data, received in the buffer planes such as 42, to printer resolution both horizontally and vertically.

The scale unit provides a means of scaling contone or bi-level data to printer resolution both horizontally and vertically. Scaling is achieved by replicating a data value an integer number of times in both dimensions. Processes by which to scale data will be familiar to those skilled in the art.

Two control bits are provided to the scale unit 43 by the margin unit 57: advance dot and advance line. The advance dot bit allows the state machine to generate multiple instances of the same dot data (useful for page margins and creating dot data for overlapping segments in the printhead). The advance line bit allows the state machine to control when a particular line of dots has been finished, thereby allowing truncation of data according to printer margins. It also saves the scale unit from requiring special end-of-line logic. The input to the scale unit is a full line buffer. The line is used scale factor times to effect vertical up-scaling via line replication, and within each line, each value is used scale factor times to effect horizontal up-scaling via pixel replication. Once the input line has been used scale factor times (the advance line bit has been set scale factor times), the input buffer select bit of the address is toggled (double buffering). The logic for the scale unit is the same for the 8-bit and 1-bit case, since the scale unit only generates addresses.

Since each of the contone layers can be a different resolution, they are scaled independently. The bi-level spot1 layer at buffer 45 and the dither matrix select layer at buffer 46 also needs to be scaled. The bi-level tag data at buffer 47 is established at the correct resolution and does not need to be scaled. The scaled-up dither matrix select bit is used by the dither matrix access unit 48 to select a single 8-bit value from the two dither matrices. The 8-bit value is output to the 4 comparators 44, and 49 to 51, which simply compare it to the specific 8-bit contone value. The generation of an actual dither matrix is dependent on the structure of the printhead and the general processes by which to generate one will be familiar to those skilled in the art. If the contone value is greater than the 8-bit dither matrix value a 1 is output. If not, then a 0 is output. These bits are then all ANDed at 52 to 56 with an inPage bit from the margin unit 57 (whether or not the particular dot is inside the printable area of the page). The final stage in the HCU is the compositing stage. For each of the 6 output layers there is a single dot merger unit, such as unit 58, each with 6 inputs. The single output bit from each dot merger unit is a combination of any or all of the input bits. This allows the spot color to be placed in any output color plane (including infrared for testing purposes), black to be merged into cyan, magenta and yellow (if no black ink is present in the printhead), and tag dot data to be placed in a visible plane. A fixative color plane can also be readily generated. The dot reorg unit (DRU) 59 is responsible for taking the generated dot stream for a given color plane and organizing it into 32-bit quantities so that the output is in segment order, and in dot order within segments. Minimal reordering is required due to the fact that dots for overlapping segments are not generated in segment order.

Two control bits are provided to the scale units by the margin unit 57: advance dot and advance line. The advance dot bit allows the state machine to generate multiple instances of the same dot data (useful for page margins and creating dot data for overlapping segments in the printhead). The advance line bit allows the state machine to control when a particular line of dots has been finished, thereby allowing truncation of data according to printer margins. It also saves the scale unit from requiring special end-of-line logic.

The comparator unit contains a simple 8-bit "greater-than" comparator. It is used to determine whether the 8-bit contone value is greater than the 8-bit dither matrix value. As such, the comparator unit takes two 8-bit inputs and produces a single 1-bit output.

Figure 6:
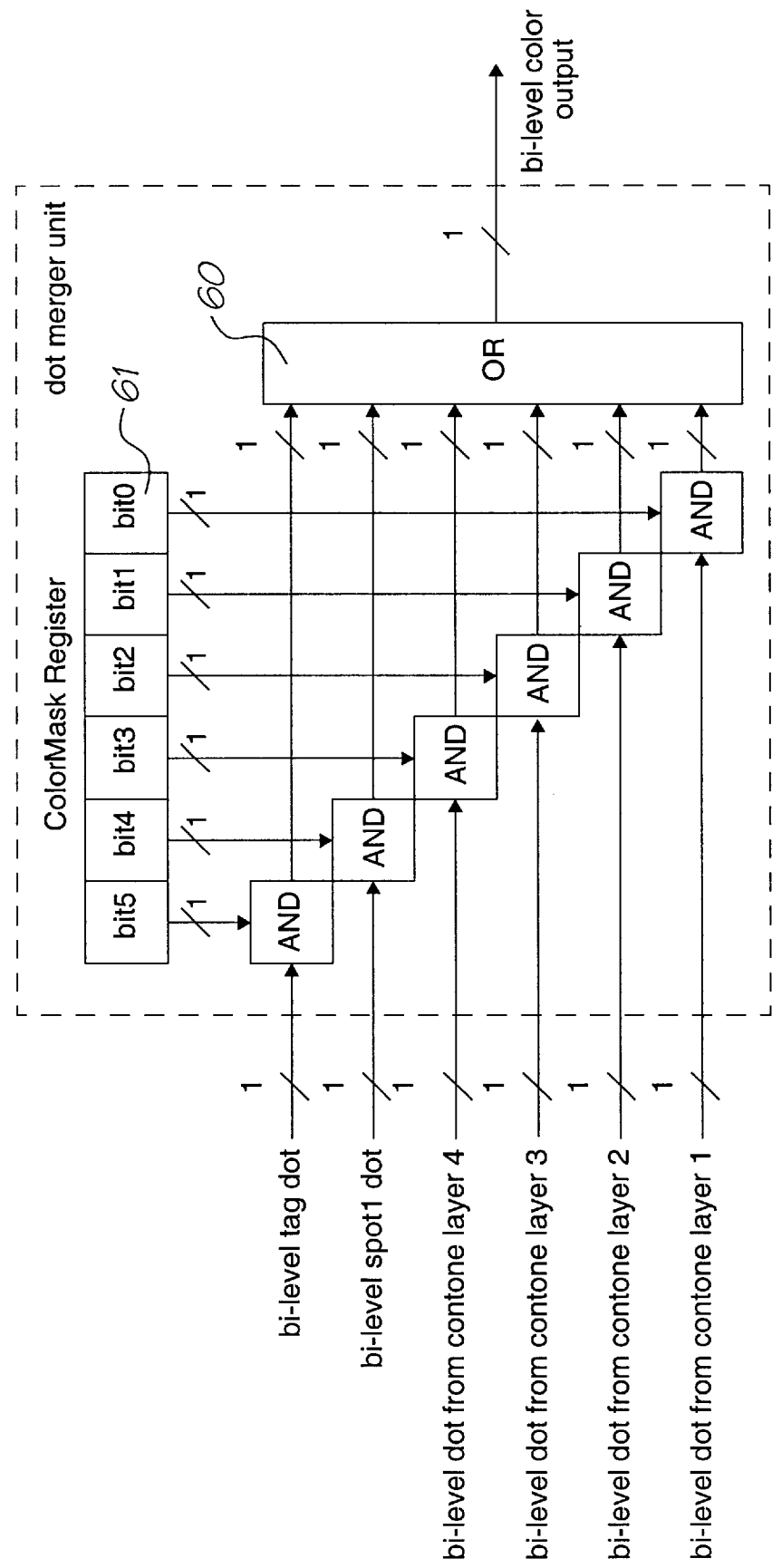
FIG. 6 shows a block diagram illustrating the process within the dot merger unit of FIG. 5.

In FIG. 6 is seen more detail of the dot merger unit. It provides a means of mapping the bi-level dithered data, the spot1 color, and the tag data to output inks in the actual printhead. Each dot merger unit takes 6 1-bit inputs and produces a single bit output that represents the output dot for that color plane. The output bit at 60 is a combination of any or all of the input bits. This allows the spot color to be placed in any output color plane (including infrared for testing purposes), black to be merged into cyan, magenta and yellow (in the case of no black ink in the printhead), and tag dot data to be placed in a visible plane. An output for fixative can readily be generated by simply combining all of the input bits. The dot merger unit contains a 6-bit ColorMask register 61 that is used as a mask against the 6 input bits. Each of the input bits is ANDed with the corresponding ColorMask register bit, and the resultant 6 bits are then ORed together to form the final output bit.

Figure 7:
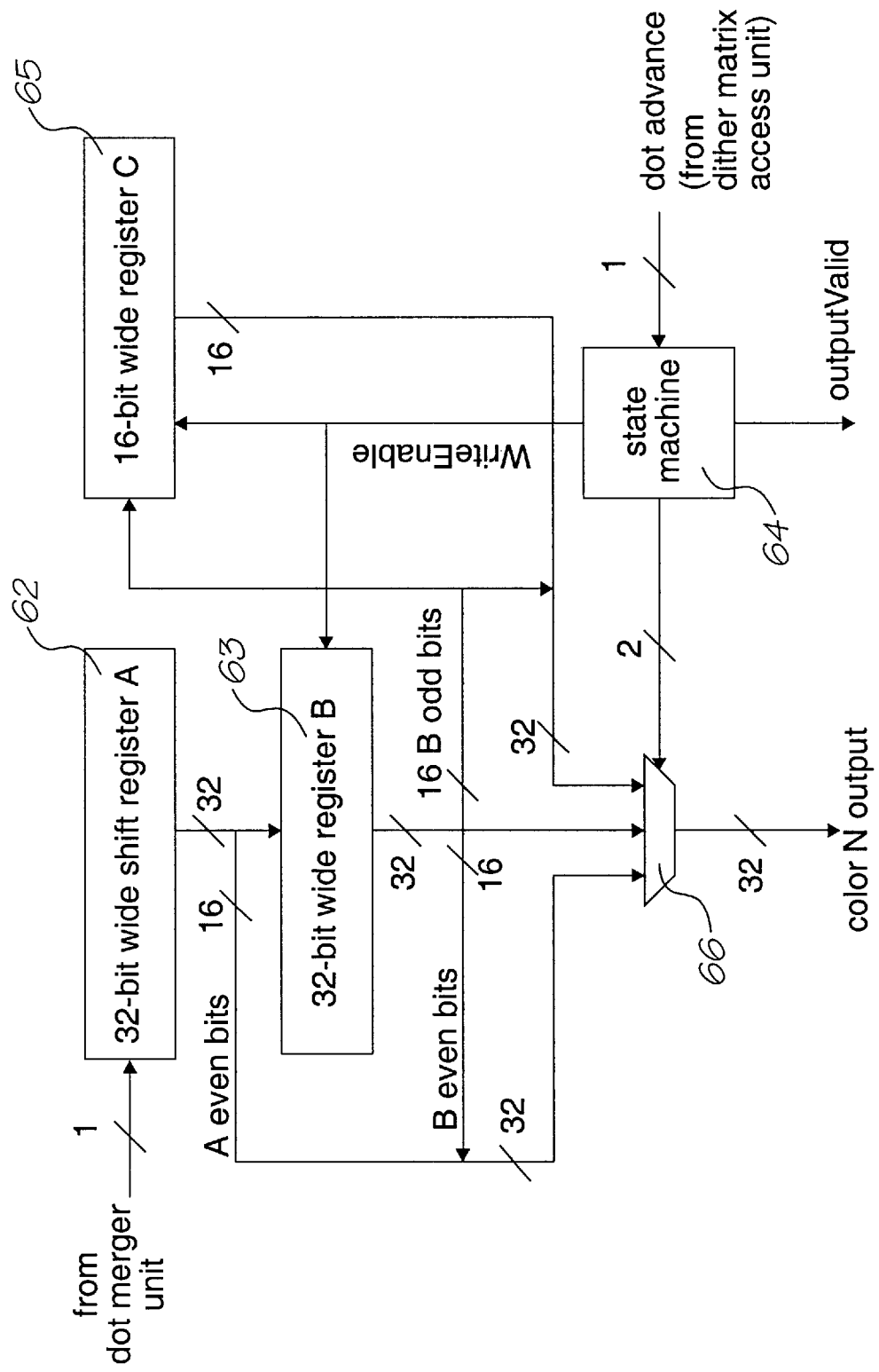
FIG. 7 shows a diagram illustrating the process within the dot reorganization unit of FIG. 5.

In FIG. 7 is seen the dot reorg unit (DRU) which is responsible for taking the generated dot stream for a given color plane and organizing it into 32-bit quantities so that the output is in segment order, and in dot order within segments. Minimal reordering is required due to the fact that dots for overlapping segments are not generated in segment order. The DRU contains a 32-bit shift register, a regular 32-bit register, and a regular 16-bit register. A 5-bit counter keeps track of the number of bits processed so far. The dot advance signal from the dither matrix access unit (DMAU) is used to instruct the DRU as to which bits should be output.

In FIG. 7 register (A) 62 is clocked every cycle. It contains the 32 most recent dots produced by the dot merger unit (DMU). The full 32-bit value is copied to register (B) 63 every 32 cycles by means of a WriteEnable signal produced by the DRU state machine 64 via a simple 5-bit counter. The 16 odd bits (bits 1, 3, 5, 7 etc.) from register (B) 63 are copied to register(C) 65 with the same WriteEnable pulse. A 32-bit multiplexor 66 then selects between the following 3 outputs based upon 2 bits from the state machine:

the full 32 bits from register B

A 32-bit value made up from the 16 even bits of register A (bits 0, 2, 4, 6 etc.) and the 16 even bits of register B. The 16 even bits from register A form bits 0 to 15, while the 16 even bits from register B form bits 16–31.

A 32-bit value made up from the 16 odd bits of register B (bits 1, 3, 5, 7 etc.) and the 16 bits of register C. The bits of register C form bits 0 to 15, while the odd bits from register B form bits 16–13.

The state machine for the DRU can be seen in Table 1. It starts in state 0. It changes state every 32 cycles. During the 32 cycles a single noOverlap bit collects the AND of all the dot advance bits for those 32 cycles (noOverlap=dot advance for cycle 0, and noOverlap=noOverlap AND dot advance for cycles 1 to 31).

TABLE 1

State machine for DRU

| State | No Overlap | Output | output Valid | Comment | next state |
|---|---|---|---|---|---|
| 0 | X | B | 0 | Startup state | 1 |
| 1 | 1 | B | 1 | Regular non-overlap | 1 |
| 1 | 0 | B | 1 | A contains first overlap | 2 |
| 2 | X | Even A, even B | 1 | A contains second overlap B contains first overlap | 3 |
| 3 | X | C, odd B | 1 | C contains first overlap B contains second overlap | |

The margin unit (MU) 57, in FIG. 5, is responsible for turning advance dot and advance line signals from the dither matrix access unit (DMAU) 48 into general control signals based on the page margins of the current page. It is also responsible for generating the end of page condition. The MU keeps a counter of dot and line across the page. Both are set to 0 at the beginning of the page. The dot counter is advanced by 1 each time the MU receives a dot advance signal from the DMAU. When the MU receives a line advance signal from the DMAU, the line counter is incremented and the dot counter is reset to 0.

Each cycle, the current line and dot values are compared to the margins of the page, and appropriate output dot advance, line advance and within margin signals are given based on these margins. The DMAU contains the only substantial memory requirements for the HCU.

Figure 8:
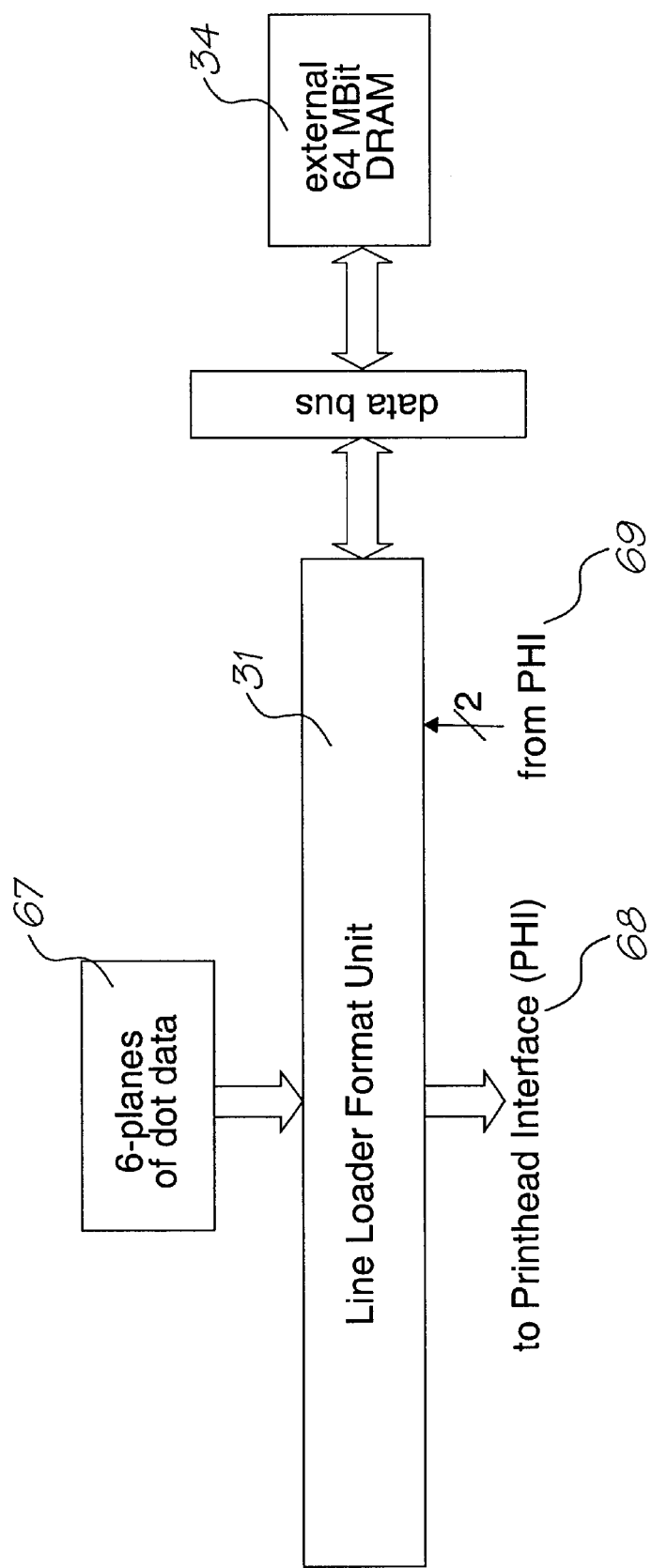
FIG. 8 shows a diagram illustrating the process within the line loader/format unit (LLFU) of FIG. 5.
Figure 9:
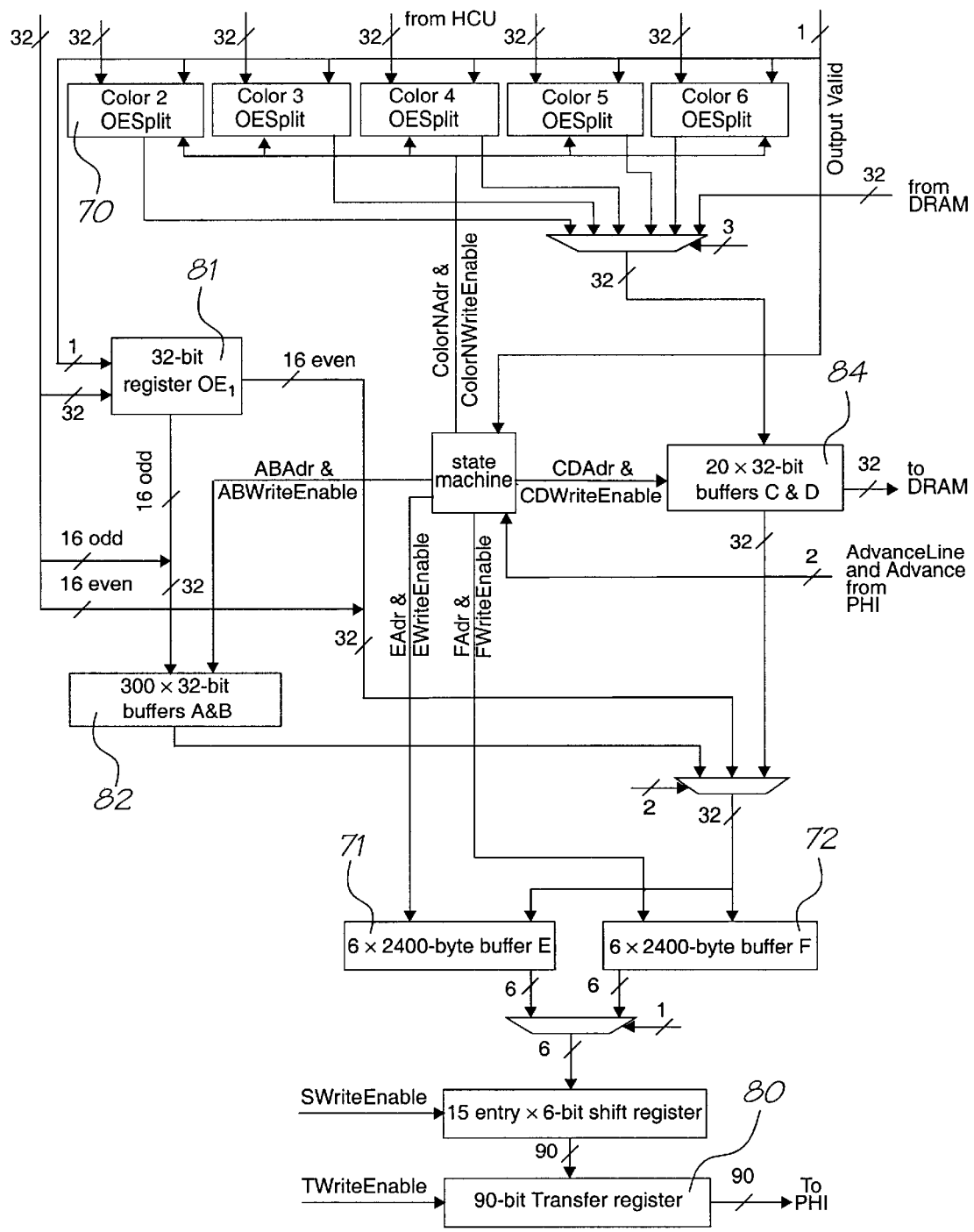
FIG. 9 is a diagram showing internal circuitry to generate color data in the LLFU of FIG. 8.

In FIG. 8 is seen the line loader/format unit (LLFU). It receives dot information from the HCU, loads the dots for a given print line into appropriate buffer storage (some on chip, and some in external DRAM 34) and formats them into the order required for the printhead. A high-level block diagram of the LLFU in terms of its external interface is shown in FIG. 9. The input 67 to the LLFU is a set of 6 32-bit words and a DataValid bit, all generated by the HCU. The output 68 is a set of 90 bits representing a maximum of 15 printhead segments of 6 colors. Not all the output bits may be valid, depending on how many colors are actually used in the printhead.

The physical placement of firing nozzles on the printhead referenced above, nozzles in two offset rows, means that odd and even dots of the same color are for two different lines. The even dots are for line L, and the odd dots are for line L-2. In addition, there is a number of lines between the dots of one color and the dots of another. Since the 6 color planes for the same dot position are calculated at one time by the HCU, there is a need to delay the dot data for each of the color planes until the same dot is positioned under the appropriate color nozzle.

The size of each buffer line depends on the width of the printhead. Since a single PEC generates dots for up to 15 printhead segments, a single odd or even buffer line is therefore 15 sets of 640 dots, for a total of 9600 bits (1200 bytes). For example, the buffers required for color 6 odd dots totals almost 45 KBytes.

Figure 10:
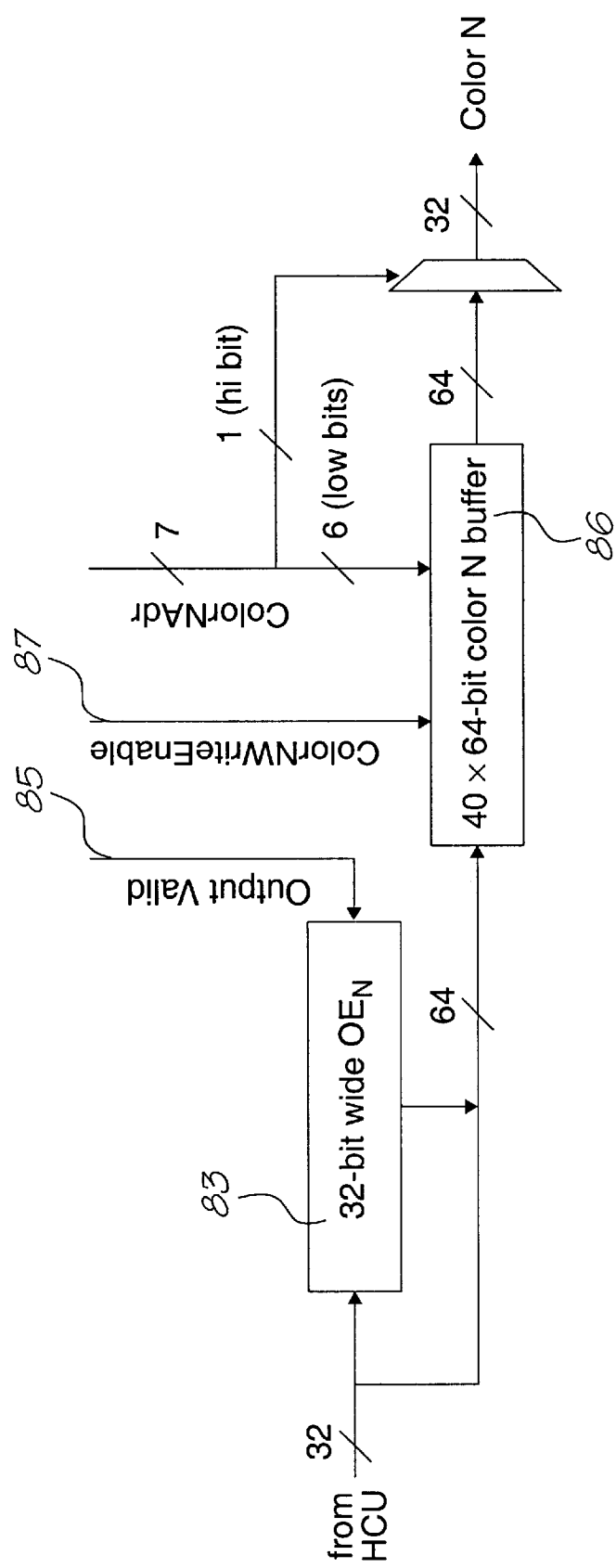
FIGS. 10 and 11 illustrate components of the LLFU seen in FIG. 9.
Figure 11:
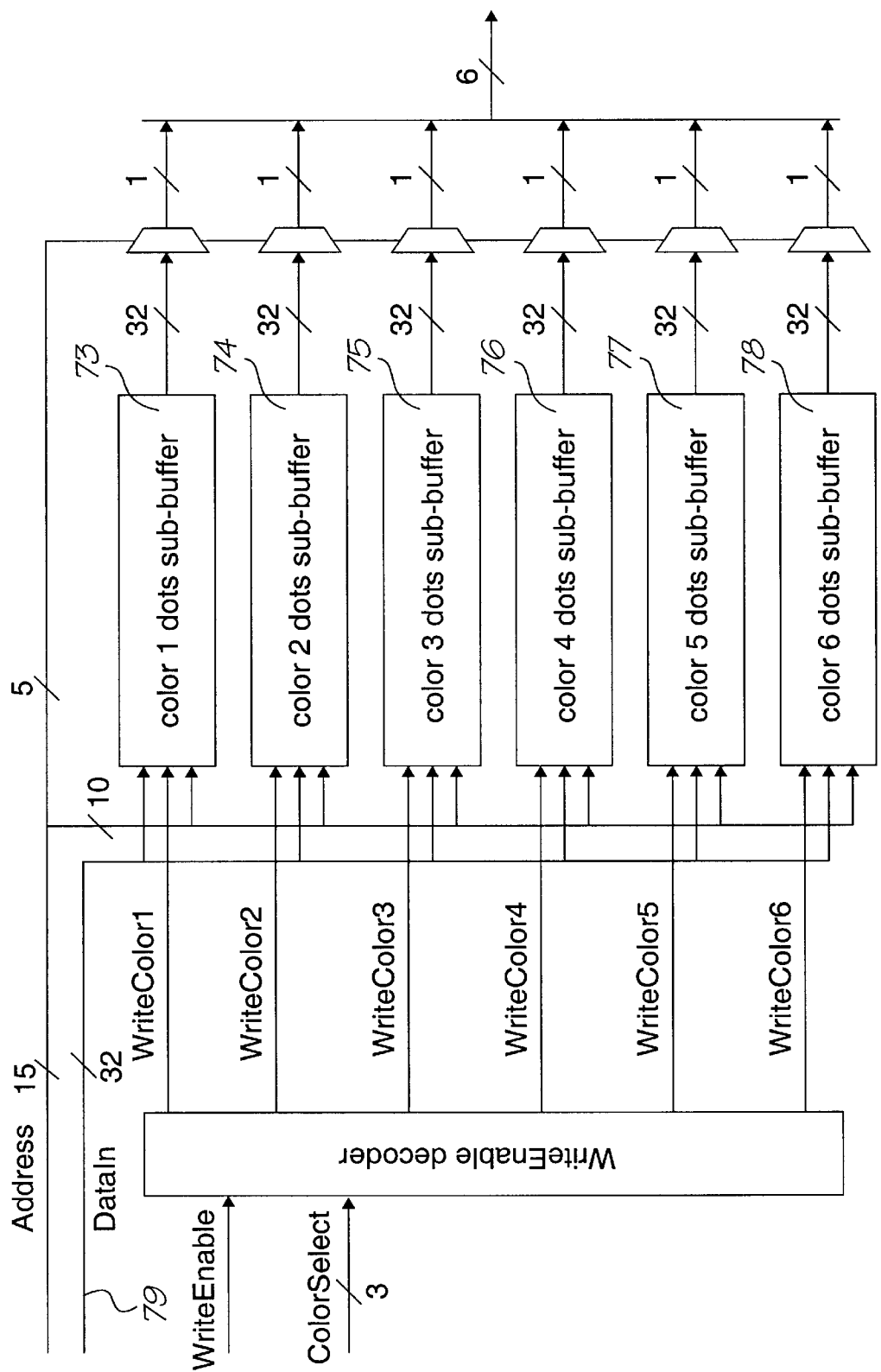

In FIG. 10 is seen a block diagram for Color N OESplit (see Oesplit 70 of FIG. 9), and the block diagram for each of the two buffers E and F, 71,72 in FIG. 9 can be found in FIGS. 10 and 11. Buffer EF is a double-buffered mechanism for transferring data to the printhead interface (PHI) 32 in FIG. 3. Buffers E and F therefore have identical structures. During the processing of a line of dots, one of the two buffers is written to while the other is being read from. The two buffers are logically swapped upon receipt of the line-sync signal from the PHI. Both buffers E and F are composed of 6 sub-buffers, 1 sub-buffer per color, as shown in FIG. 11, the color 1 sub-buffer numbered 73. The size of each sub-buffer is 2400 bytes, enough to hold 15 segments at 1280 dots per segment. The memory is accessed 32-bits at a time, so there are 600 addresses for each sub-buffer (requiring 10 bits of address). All the even dots are placed before the odd dots in each color's sub-buffer. If there is any unused space (for printing to fewer than 15 segments) it is located at the end of each color's sub-buffer. The amount of memory actually used from each sub-buffer is directly related to the number of segments actually addressed by the PEC. For a 15-segment printhead there are 1200 bytes of even dots followed by 1200 bytes of odd dots, with no unused space. The number of sub-buffers gainfully used is directly related to the number of colors used in the printhead. The maximum number of colors supported is 6.

The addressing decoding circuitry for each of buffers E and F is such that in a given cycle, a single 32-bit access can be made to all 6 sub-buffers—either a read from all 6 or a write to one of the 6. Only one bit of the 32-bits read from each color buffer is selected, for a total of 6 output bits. The process is shown in FIG. 11. 15 bits of address allow the reading of a particular bit by means of 10-bits of address being used to select 32 bits, and 5-bits of address choose 1-bit from those 32. Since all color sub-buffers share this logic, a single 15-bit address gives a total of 6 bits out, one bit per color. Each sub-buffer 73 to 78 has its own WriteEnable line, to allow a single 32-bit value to be written to a particular color buffer in a given cycle. The individual WriteEnables are generated by ANDing the single WriteEnable input with the decoded form of ColorSelect. The 32-bits of DataIn on line 79 are shared, since only one buffer will actually clock the data in.

Address generation for reading from buffers E and F is straightforward. Each cycle generates a bit address that is used to fetch 6 bits representing 1-bit per color for a particular segment. By adding 640 to the current bit address, we advance to the next segment's equivalent dot. We add 640 (not 1280) since the odd and even dots are separated in the buffer. We do this NumSegments times to retrieve the data representing the even dots, and transfer those bits to the PHI. When NumSegments=15, the number of bits is 90 (15×6 bits). The process is then repeated for the odd dots. This entire even/odd bit generation process is repeated 640 times, incrementing the start address each time. Thus all dot values are transferred to the PHI in the order required by the printhead in 640×2× NumSegments cycles. When NumSegments=15, the number of cycles is 19,200 cycles. Note that regardless of the number of colors actually used in the printhead, 6 bits are produced in a given read cycle (one bit from each color's buffer).

In addition, we generate the TWriteEnable control signal for writing to the 90-bit Transfer register 90 in FIG. 9. Since the LLFU starts before the PHI, we must transfer the first value before the Advance pulse from the PHI. We must also generate the next value in readiness for the first Advance pulse. The solution is to transfer the first value to the Transfer register after NumSegments cycles, and then to stall NumSegments cycles later, waiting for the Advance pulse to start the next NumSegments cycle group. Once the first Advance pulse arrives, the LLFU is synchronized to the PHI.

The read process for a single dotline is shown in the following pseudocode:

```
DoneFirst = FALSE
WantToXfer = FALSE
For DotInSegment0 = 0 to 1279
    If (DotInSegment0:bit0 == 0)
       CurrAdr = DotInSegment0 (high bits) (puts in range 0 to 639)
    EndIf
    XfersRemaining = NumSegments
    Do
       WantToXfer = (XfersRemaining == 0)
       TWriteEnable = (WantToXfer AND NOT DoneFirst) OR
       PHI:ADVANCE
       DoneFirst = DoneFirst OR TWriteEnable
       Stall = WantToXfer AND (NOT TWriteEnable)
       SWriteEnable = NOT(Stall)
       If (SWriteEnable)
          Shift Register = Fetch 6 bits from EFSense[ReadBuffer]:
          CurrAdr
          CurrAdr = CurrAdr + 640
          XfersRemaining = XfersRemaining - 1
       EndIf
       Until (TWriteEnable)
EndFor
Wait until BufferEF Write process has finished
EFSense = NOT (EFSense)
```

While read process is transferring data from F or F to the PHI, a write process is preparing the next dot-line in the other buffer.

The data being written to E or F is color 1 data generated by the HCU, and color 2–6 data from buffer D (supplied from DRAM). Color 1 data is written to EF whenever the HCU's OutputValid flag is set, and color 2–6 data is written during other times from register C.

Buffer $OE_1$ 81 in FIG. 9 is a 32-bit register used to hold a single HCU-generated set of contiguous 32 dots for color 1. While the dots are contiguous on the page, the odd and even dots are printed at different times.

Buffer AB 82 is a double buffered mechanism for delaying odd dot data for color 1 by 2 dotlines. Buffers A and B therefore have identical structures. During the processing of a line of dots, one of the two buffers is read from and then written to. The two buffers are logically swapped after the entire dot line has been processed. A single bit flag ABSense determines which of the two buffers are read from and written to.

The HCU provides 32-bits of color 1 data whenever the output valid control flag is set, which is every 32 cycles after the first flag has been sent for the line. The 32 bits define a contiguous set of 32 dots for a single dot line—16 even dots (bits 0, 2, 4 etc.), and 16 odd dots (bits 1, 3, 5 etc.). The output valid control flag is used as a WriteEnable control for the $OE_1$ register 81. We process the HCU data every 2 OutputValid signals. The 16 even bits of HCU color 1 data are combined with the 16 even bits of register $OE_1$ to make 32-bits of even color 1 data. Similarly, the 16 odd bits of HCU color 1 data are combined with the 16 odd bits of register $OE_1$ to make 32-bits of odd color 1 data. Upon receipt of the first OutputValid signal of the group of two, we read buffer AB to transfer the odd data to color 1, 73 in FIG. 11 within buffer EF. Upon receipt of the second OutputValid signal of the group of two, we write the 32-bits of odd data to the same location in buffer AB that we read from previously, and we write the 32-bits of even data to color 1 within buffer EF.

The HCU provides 32 bits of data per color plane whenever the OutputValid control flag is set. This occurs every 32 cycles except during certain startup times. The 32 bits define a contiguous set of 32 dots for a single dot line—16 even dots (bits 0, 2, 4 etc.), and 16 odd dots (bits 1, 3, 5 etc.).

While buffer $OE_1$(83 in FIG. 10) is used to store a single 32-bit value for color 1, buffers $OE_2$ to $OE_6$ are used to store a single 32-bit value for colors 2 to 6 respectively. Just as the data for color 1 is split into 32-bits representing color 1 odd dots and 32-bits representing color 1 even dots every 64 cycles (once every two OutputValid flags), the remaining color planes are also split into even and odd dots.

However, instead of being written directly to buffer EF, the dot data is delayed by a number of lines, and is written out to DRAM via buffer CD (84 in FIG. 9). While the dots for a given line are written to DRAM, the dots for a previous line are read from DRAM and written to buffer EF (71,72). This process must be done interleaved with the process writing color 1 to buffer EF.

Every time an OutputValid flag is received from the HCU on line 85 in FIG. 10, the 32-bits of color N data are written to buffer $OE_N$ (83). Every second OutputValid flag, the combined 64-bit value is written to color buffer N (86). This happens in parallel for all color planes 2–6. Color Buffer N (86) contains 40 sets of 64-bits (320 bytes) to enable the dots for two complete segments to be stored. This allows a complete segment generation, time (20×64=1280 cycles) for the previous segment's data (both odd and even dots) to be written out to DRAM. Address generation for writing is straightforward. The ColorNWriteEnable signal on line 87 is given every second OutputValid flag. The address starts at 0, and increments every second OutputValid flag until 39. Instead of advancing to 40, the address is reset to 0, thus providing the double-buffering scheme. This works so long as the reading does not occur during the OutputValid flag, and that the previous segment's data can be written to DRAM in the time it takes to generate a single segment's data. The process is shown in the following pseudocode:

```
adr = 0
firstEncountered = 0
While (NOT AdvanceLine)
    If (HCU_OutputValid) AND (firstEncountered))
       ColorNWriteEnable = TRUE
       ColorNAdr = adr
       If (adr == 39)
          adr = 0
       Else
          adr = adr + 1
       EndIf
    Else
       ColorNWriteEnable = FALSE
    EndIf
    If (HCU_OutputValid)
       firstEncountered = NOT(firstEncountered)
    EndIf
EndWhile
```

Address generation for reading is trickier, since it is tied to the timing for DRAM access (both reading and writing), buffer EF access, and therefore color 1 generation. It is more fully explained below.

Address generation for buffers C, D, E, F, and colorN are all tied to the timing of DRAM access, and must not interfere with color 1 processing with regards to buffers E and F. The basic principle is that the data for a single segment of color N (either odd or even dots) is transferred from the DRAM to buffer EF via buffer CD. Once the data has been read from DRAM those dots are replaced based on the values in ColorBufferN. This is done for each of the colors in odd and even dots. After a complete segment's worth of dots has accumulated (20 sets of 64 cycles), then the process begins again. Once the data for all segments in a given printline has been transferred from and to DRAM, the current address for that color's DRAM buffer is advanced so that it will be the appropriate number of lines until the particular data for the color's line is read back from DRAM. In this respect then, the DRAM acts as a form of FIFO. Consequently color N (either odd or even) is read from DRAM into buffer D while copying color N (same odd/even sense) to buffer C. The copying of data to buffer C takes 20 or 21 cycles depending on whether the OutputValid flag occurs during the 20 transfers. Once both tasks have finished (typically the DRAM access will be the slower task), the second part of the process begins. The data in buffer C is written to DRAM (the same locations as were just read) and the data in buffer D is copied to buffer EF (again, no color N data is transferred to buffer EF while the OutputValid flag is set since color 1 data is being transferred). When both tasks have finished the same process occurs for the other sense of color N (either odd or even), and then for each of the remaining colors. The entire double process happens 10 times. The addresses for each of the current lines in DRAM are then updated for the next line's processing to begin.

The address generation process can be considered as NumSegments worth of 10 sets of: 20×32-bit reads followed by 20×32-bit writes, and it can be seen in the following pseudocode:

```
EFStartAdr = 0
Do NumSegments times:
    For CurrColor = 0 to MaxHalfColors
        DRAMStartAddress = ColorCurrAdr[CurrColor]
        While reading 640 bits from DRAMStartAddress into
        D(>=20 cycles)
            ColorNAdr = 0
            While (ColorNAdr !=20)
                If (NOT HCU_OutputValid)
                    Transfer ColorNBuffer[ColorNAdr|CurrColor_bit0] to
                    C[ColorNAdr]
                    ColorNAdr = ColorNAdr + 1
                EndIf
            EndWhile
        EndWhile - wait until read has finished
        While writing 640 bits from C into DRAMStartAddress
        (>=20 cycles)
            ColorNAdr = 0
            EFAdr = EFStartAdr
            While (ColorNAdr !=20)
                If (NOT HCU_OutputValid)
                    Transfer D[ColorNAdr] to EF[CurrColor|EFAdr]
                    If ((ColorNAdr == 19) AND
                    (CurrColor == NumHalfColors))
                        EFStartAdr = EFAdr + 1
                    Else
                        EFAdr = EFAdr + 1
                    EndIf
                    ColorNAdr = ColorNAdr + 1
                EndIf
            EndWhile
        EndWhile - wait until write has finished
        If (DRAMStartAddress = DRAMMaxVal)
            ColorCurrAdr[currColor] = round up DRAMStartAddress to
            next 1KByte page
        Else
            ColorCurrAdr[currColor] = DRAMStartAddress + 640 bits
        EndIf
        If (Segment == maxSegments)
            If (ColorCurrRow[CurrColor] == ColorMaxRow[CurrColor])
                ColorCurrRow[currColor] = ColorStartRow[currColor]
                ColorCurrAdr[currColor] = ColorStartAdr[currColor]
            Else
                ColorStartRow[currColor] = ColorCurrRow[currColor] + 1
            EndIf
        EndIf
    EndFor
EndDo
Wait until next Advance signal from PHI
```

Note that the MaxHalfColors register is one less than the number of colors in terms of odd and even colors treated separately, but not including color 1. For example, in terms of a standard 6 color printing system there are 10 (colors 2–6 in odd and even), and so Max-HalfColors should be set to 9.

The LLFU requires 2NumSegments cycles to prepare the first 180 bits of data for the PHI. Consequently the printhead should be started and the first LineSync pulse must occur this period of time after the LLFU has started. This allows the initial Transfer value to be valid and the next 90-bit value to be ready to be loaded into the Transfer register.

The printhead interface (PHI) is the means by which the processor loads the printhead with the dots to be printed, and controls the actual dot printing process. It takes input from the LLFU and outputs data to the printhead itself. The PHI will be capable of dealing with a variety of printhead lengths and formats. The internal structure of the PHI should allow for a maximum of 6 colors, 8 segments per transfer, and a maximum of 2 segment groups. This should be sufficient for a 15 segment (8.5 inch) printer capable of printing A4/Letter at full bleed.

A combined printhead's characterization vector can be read back via the serial interface. The characterization vector may include dead nozzle information as well as relative segment alignment data. Each printhead segment can be queried via its low speed serial bus to return a characterization vector of the segment. The characterization vectors from multiple printheads can be combined to construct a nozzle defect list for the entire printhead and allows the print engine to compensate for defective nozzles during the print. As long as the number of defective nozzles is low, the compensation can produce results indistinguishable from those of a printhead with no defective nozzles.

Each segment has 384 bits for characterization vector, comprised of:

- 64 bits of flags and printhead segment information, including serial number and number of colors represented in the segment
- 16 bits of alignment data relative to previous segment (0=first segment)
- a variable lengthed defective nozzle list using up the remaining bits The defective nozzle list is variable lengthed, with each set of defective nozzles having the following structure:

- 5 bits count (0=end-of-list)
- 3 bits of color
- count×11 bits, one entry per defective nozzle In general terms a printhead segment has connections as defined in Table 12. Note that some of the connections are replicated when multiple colors are present.

TABLE 12

Printhead segment connections

| Name | Repeat for multi-colored segment | Function |
|---|---|---|
| D[n] | Yes | Channel n of image data |
| SClk | No | Serial data transfer clock |
| NPSync | No | Nozzle Phase Synchronization |
| PLL | No | Phase Locked Loop clock |
| Ten | No | Parallel transfer enable |
| Reset | No | Control Reset |
| SCl | No | I²C serial clock for control |
| SD | No | I²C serial data for control |
| CCEn[n] | No | Control Chip Enable [n] |
| Gnd | No | Analog ground |
| Sense | No | Analog sense output |
| V− | Yes | Negative actuator supply |
| V+ | Yes | Positive actuator supply |
| $V_{ss}$ | Yes | Negative logic supply |
| $V_{dd}$ | Yes | Positive logic supply |

The 21 mm long printhead segment may have 64 bond pads, on 300 µm centers. 24 of these bond pads are V− power supply to the actuators, and 20 are V+ power supply to the actuators. The remaining 20 connections are CMOS logic power, signal, and data connections. Table 13 details these connections.

TABLE 13

6 color segment connections

| # | Name | Function |
|---|---|---|
| 1–6 | V− | Negative actuator supply |
| 7 | $V_{ss}$ | Negative logic supply |
| 8 | D1[n] | Channel 1 of image data [n] (fixative in 6 channel printhead) |
| 9 | D2[n] | Channel 2 of image data [n] (infrared in 6 channel printhead) |
| 10 | SClk | Serial data transfer clock |
| 11 | $V_{dd}$ | Positive logic supply |
| 12–16 | V+ | Positive actuator supply |
| 17–22 | V− | Negative actuator supply |
| 23 | NPSync | Nozzle Phase Synchronization |
| 24 | D3[n] | Channel 3 of image data [n] (black in 6 channel printhead) |
| 25 | D4[n] | Channel 4 of image data [n] (yellow in 6 channel printhead) |
| 26 | PLL | Phase Locked Loop clock |
| 27 | TEn | Parallel transfer enable |
| 28–32 | V+ | Positive actuator supply |
| 33–38 | V− | Negative actuator supply |
| 39 | Reset | Control Reset |
| 40 | D5[n] | Channel 5 of image data [n] (magenta in 6 channel printhead) |
| 41 | D6[n] | Channel 6 of image data [n] (cyan in 6 channel printhead) |
| 42 | SCl | I²C serial clock for control |
| 43 | SD | I²C serial data for control |
| 44–48 | V+ | Positive actuator supply |
| 49–54 | V− | Negative actuator supply |
| 55 | $V_{dd}$ | Positive logic supply |
| 56 | Gnd | Analog ground |
| 57 | CCEn[n] | Control Chip Enable [n] |
| 58 | $V_{ss}$ | Negative logic supply |
| 59 | Sense | Analog sense output |
| 60–64 | V+ | Positive actuator supply |

A multi-segment printhead is ideally composed of a number of identical printhead segments. These are typically 21 mm segments that are manufactured together, or placed together after manufacture, to produce a printhead of the desired length. The segments may be set with overlap, as desired, to allow for smooth transitions between segments. Each 21 mm inch segments prints 1600 dpi bi-level dots over a different part of the page to produce the final image. Although each segment produces 1280 dots of the final image, each dot is represented by a combination of colored inks. For example, 15 segments can be combined side-by-side to produce a 12-inch printhead. Each segment can be considered to have a lead-in area, a central area, and a lead-out area. The lead-out of one segment corresponds to the lead-in of the next.

Figure 12:
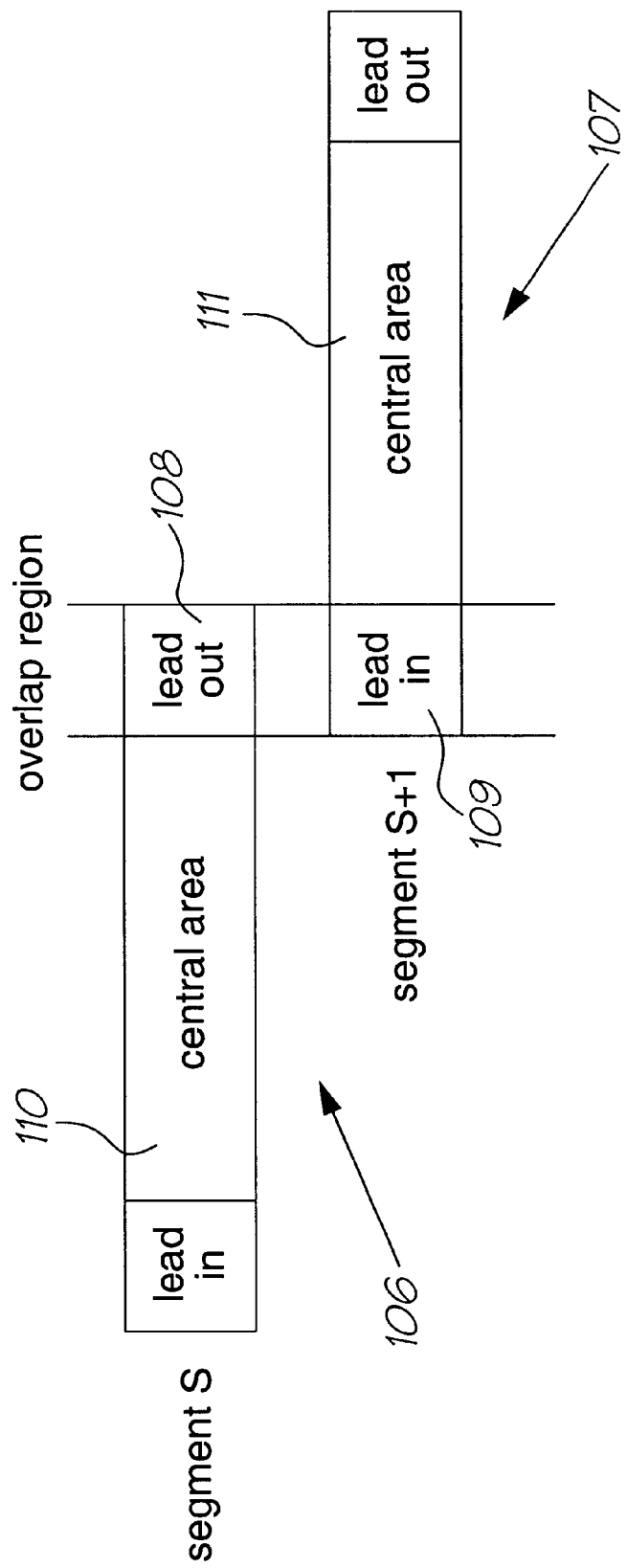
FIG. 12 shows the manner of overlap of segments in a multi-segment printhead.

In FIG. 12 is seen the three areas of a segment by showing two overlapping segments 106, 107. Note that a lead-out area 108 of segment S (106) corresponds to a lead-in area 109 of segment S+1 (107). A central area of a segment is that area that has no overlap at all (110 of 106 and 111 of 107). Although the figure shows the segments vertically staggered, the segments are staggered at a slight angle so that they are aligned in the vertical dimension.

It is assumed below that a printhead has been constructed from a number of segments as described above. It is assumed that for data loading purposes, the segments have been grouped into G segment groups, with L segments in the largest segment group. It is assumed there are C colors in the printhead. It is assumed that the firing mechanism for the printhead is that all segments fire simultaneously, and only one segment at a time places feedback information on a common tri-state bus. Assuming all these things, Table 15 lists the external connections that are available from a printhead:

TABLE 15

Printhead connections

| Name | #Pins | Description |
|---|---|---|
| Dn | CL | Inputs to C shift registers of segments 0 to L-1 |
| SClk | G | A pulse on SClk[N] (ShiftRegisterClock N) loads the current values from Dn lines into the L segments in segment group N. |
| NPSync | 1 | A pulse on NPSync starts the printing of a line for all segments. |
| PLL | 1 | Phase Locked Loop clock for generation of timing signals in printhead |
| Ten | 1 | Parallel transfer of data from the shift registers to the internal NozzleEnable bits (one per nozzle). |
| Reset | 1 | Control reset |
| SCl | 1 | I²C serial clock for control |
| SD | 1 | I²C serial data for control |
| CCEn | G | A pulse on CCEn N ANDed with data on D1 [n] selects the sense lines for segment n in segment group N. |
| Sense | 1 | Analog sense output |
| Gnd | 1 | Analog sense ground |
| V− | Many, depending on the number of colors | Negative actuator supply |
| V+ | | Positive actuator supply |
| $V_{ss}$ | | Negative logic supply |
| $V_{dd}$ | | Positive logic supply |

With reference to FIG. 5 the HCU 29 provides the means of dithering with two different dither matrices, selected by the dither matrix select bitmap. The dither matrix access unit (DMAU) 48 provides the appropriate dither value each cycle. In addition, the DMAU copes with dithering over multiple overlapping Memjet printhead segments. The purpose of the DMAU is simply to provide the appropriate 8-bit dither value for the appropriate output dot position in the printhead.

If the entire Memjet printhead was physically monolithic, a single dither matrix (eg 64×64) would suffice. However, the Memjet printhead is composed of multiple overlapping segments. The segments overlap allows for a smooth transition from one Memjet segment to another instead of a sharp edge that has the potential for visual artifacts. In addition, due to issues in placing segments, they will not necessarily be perfectly dot aligned. A regular dither matrix will not be able to cope with these transitions nor the sub-dot alignment between segments. The solution for printing with PEC is to use the characterization vector from the Memjet printhead, and construct a set of printhead specific dither matrices. Each segment can be considered to have a lead-in area, a central area, and a lead-out area. The lead-out of one segment corresponds to the lead-in of the next. The central area of a segment is that area that has no overlap at all.

In FIG. 12 is illustrated the three areas of a segment by showing the two overlapping segments 106,107. Note that the lead-out area 108 of segment S corresponds to the lead-in area 109 of segment S+1. For any number of printhead segments then, we can consider the central area to have the same dither matrix, but the lead-out area 108 of segment S and the lead-in area 109 of segment S+1 to be paired according to the alignment between the two segments. Given that multiple PECs can address the same page, a given PEC may address a certain set of segments, while another PEC may address the next set of segments. Consequently the lead-in area 109 of the first segment for a PEC may in fact correspond to the lead-out area 108 of the last segment from another PEC.

The overall goal for the dither matrix is to provide intensity level and dot-gain characteristics to match the normal dither cell for each intensity level for each point across the overlap region. A set of dither matrices is defined for the segments addressed by this print engine/controller (PEC). The set of dither matrices are referred to collectively as a multi-segment dither matrix.

- The central area dither matrix is a regular dither matrix, and can be the same for all segments (although the dither matrix value used for the first dot of the central area of a given dot line may not be the position expected due to alignment between the segment and its predecessor).
- A lead-in/lead-out dither matrix for each overlap region of a segment pair. A lead-in and lead out for the entire PEC-managed set of segments is also required. The width of the lead-in/lead-out matrix is the total number of dots in both segments in the overlap region. This number is expected to be between 32 and 48 (corresponding to an overlap width of 16 to 24). The lead-in/lead-out dither matrix for one segment and the lead-out segment for the corresponding neighbor segment are designed in conjunction with each other, taking the sub-dot alignment into account and the position within the central area dither matrix when the overlap region commences and ends.
- A lead-in dither matrix for the first segment, and a lead-out dither matrix for the last segment. These will correspond to similar matrices in other PEC-managed sets of segments. Each segment also specifies the horizontal offset in the central area dither matrix for the first dot of the segment. This allows compensation for the up to 2 dots of misalignment caused by overlapping segments. It also gives the dither matrix generation software more flexibility to provide an arbitrary joining point at the end of the lead-out component of the lead-in/lead-out dither matrix.

The multi-segment dither matrix is organized into lines. The total number of lines equals the height of the dither matrix. Each line is loaded into local DMAU memory from external DRAM in a double-buffered style. While one dot line is being generated, referencing the current line of the multi-segment dither matrix, the next line of the multi-segment dither matrix is being loaded. The dither matrix line buffers are swapped upon receipt of the advance line signal from the HCU state machine.

Figure 13:
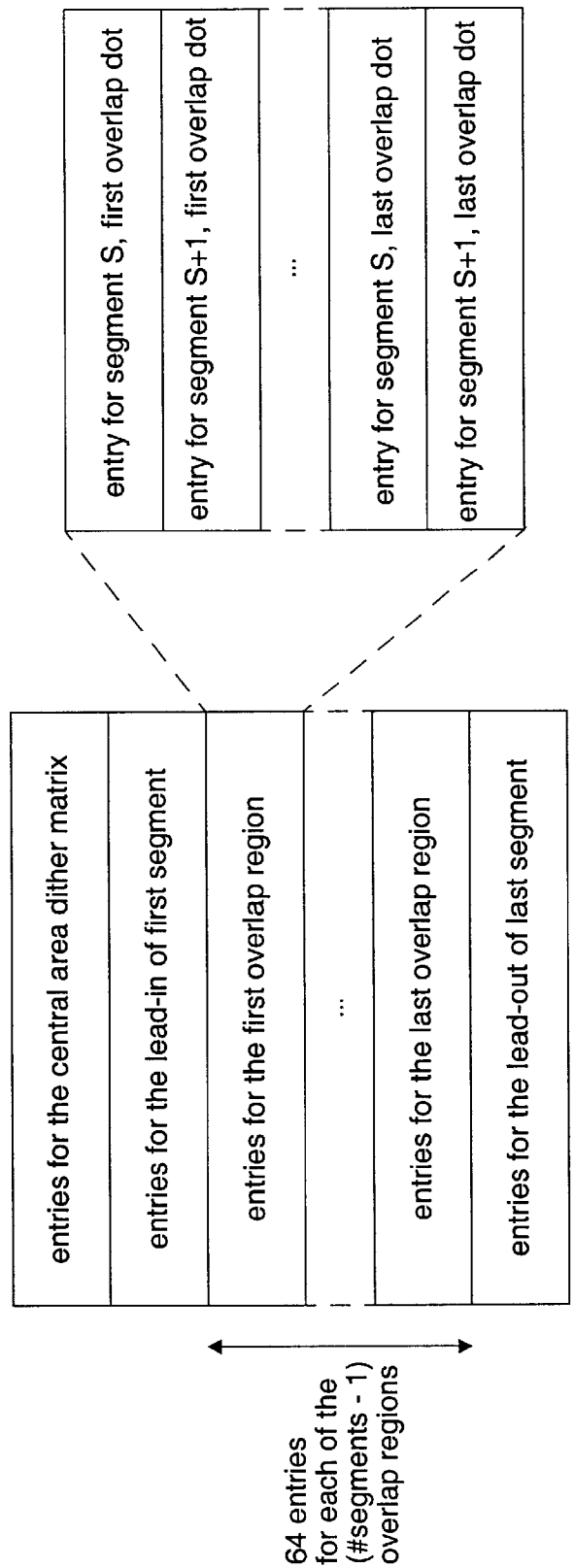
FIG. 13 illustrates the composition of a line from a multi-segment dither matrix.

In FIG. 13 is seen the composition of a line from a multi-segment dither matrix.

The size of a single line of the multi-segment dither matrix depends on the overlap size and the number of segments. Given a central area dither matrix width of 64, an overlap size of 32 dots and 15 segments, we have a total of 64+32+32+(14×(32+32)) entries, where each entry is 8-bits=1024 bytes.

The DRAM storage requirements are 64 lines (height of dither matrix) at 1 KByte per line for a total of 64 KBytes. The DMAU must load one of these lines from DRAM each output line. At maximum print speed of 30,000 lines per second, this equates to roughly 30 MB/sec.

The DMAU in fact supports two of these multi-segment dither matrices, selected by the dither matrix select bit. When the Matrix2Valid 1-bit register is set, then the second dither matrix is used. DRAM storage requirements are therefore 128 KBytes and DRAM access therefore requires a total bandwidth of 60 MB/sec at maximum printing speed. The DMAU therefore contains 4 line buffers at 1024 bytes per buffer, and 15 offset registers to use as the initial entry into the central area dither matrix (one entry for each segment).

The process of address generation is described in the following pseudocode:

```
DblBufferSelect = 0
MatrixLineStartAddress = 0 (refers to 64KByte-aligned address of start of
  Matrix1)
Load Matrix 1 address pointed to by MatrixLineStartAddress
If (Matrix2 Valid)
    Load Matrix 2, address pointed to by MatrixLineStartAddress +
      64KBytes
EndIf
Do until end-of-page
    currAdr = 64
    lineAdvance = 0
    dotAdvance = 0
    dot = 1
    segment = 1
    While (NOT lineAdvance)
        CalculateEntry
    EndWhile
    DblBufferSelect = NOT DblBufferSelect
    MatrixLineStartAddress = (MatrixLineStartAddress + 1) AND 63
    Load Matrix 1 address pointed to by MatrixLineStartAddress
    Load Matrix 2, address pointed to by MatrixLineStartAddress +
      64KBytes
EndDo
``` where Calculate Entry is a single cycle process described by the following pseudocode. Note that if the Matrix2Valid register is clear, the first dither matrix is always used, regardless of any value from the dither matrix select bitmap.

Output matrix value read from:
    DblBufferSelect, DitherMatrixSelect AND Matrix2Valid,
      CurrAdr

```
Output dotAdvance = NOT (((dot < 32) AND (segment NOT == 0) AND
(dot₀ == 0)) OR
((dot > 1248) AND (segment NOT = numSegments)) AND (dot₀ == 0))
Output lineAdvance = ((segment == numSegments) AND (dot == 1280))
If ((dot < 32) OR (dot > 1248))
    CurrAdr = CurrAdr + 1
Else If (dot == 1248)
    CurrAdr = NextOverlapAdr
Else If (dot == 32)
    NextOverlapAdr = CurrAdr
    CurrAdr = CentralAreaFirstDotDitherOffset[segment]
Else
    CurrAdr = (CurrAdr + 1) AND 63
EndIf
If (dot == 1280)
    dot = 1
    segment = segment + 1
Else
    dot = dot + 1
EndIf
    Note that the dot and segment counters are used for counting dots and
only correspond to actual segment/dot combinations during the
non-overlap areas, the first segment's lead-in and the last segment's
lead-out area. During the overlap period, alternative dots correspond to
segment S and segment S+1. The dotAdvance is therefore only given on
every second dot during this period.
```

Each printhead segment can be queried via its low speed serial bus to return a characterization vector of the segment. The characterization vectors from multiple printheads can be combined to construct a nozzle defect list for the entire printhead and allows the print engine to compensate for defective nozzles during the print. As long as the number of defective nozzles is low, the compensation can produce results indistinguishable from those of a printhead with no defective nozzles.

Each segment has 384 bits for characterization vector, comprised of:

64 bits of flags and printhead segment information, including serial number and number of colors represented in the segment 16 bits of alignment data relative to previous segment (0=first segment)

a variable lengthed defective nozzle list using up the remaining bits

The defective nozzle list is variable lengthed, with each set of defective nozzles having the following structure:

5 bits count (0=end-of-list)

3 bits of color count×11 bits, one entry per defective nozzle

The fade-in/fade-out dither matrices are not simply lead-in and lead-out. They are defined together such that when applied according to any misaligned overlap, there is a constant dot gain over the overlap region. Any two segments may not be dot aligned.

Misalignment between segments is important. Where two segments are not perfectly dot aligned, a dot on the first segment does not align perfectly with a dot on the second segment. Two dots on the second segment may overlap a dot on the first segment. If the dot on the first is printed with a dot on the second there will be a giant dot formed from the combination of the two. If the dot on the first is printed and neither of the overlapping dots on the second is printed the result is a half dot space. The first case will make a dark stripe down the page, and the second will make a white stripe down the page. Both results are undesirable.

A solution to the above misalignment problem is to have a dither cell that takes the misalignment into account so that on average the dot gain in the overlap region is constant such that there is no dark area or a stripe going down the entire page. Because there are two segments, two dither cells are needed. One can be thought of as a fade-out, and the other as a fade-in. They must be used in conjunction with each other to produce a constant dot gain. It will be evident that a different misalignment gives a different dither cell pair. The overlap caused by half a dot misalignment will be different from the overlap caused by ¼ dot misalignment. A different dither cell pair is required for each misalignment. Better dither cell pairs can be generated if it is known where in the common dither cell we are up to at the start of the overlap.

Because of misalignment there is also a need to know whether to use the expected position (if there is perfect dot alignment) within the common dither cell when the end of the overlap region is reached, or whether there is a need to be in a different column of the dither cell. There is therefore an offset value that allows the specification of which part of the common dither cell is attached to the end of a specific segment overlap pair.

The segment misalignment is therefore used for two purposes. The first is to generate a dither cell pair for the overlap region. The generation of the dither cell pair must be done to connect a known position in the common dither cell to a chosen column of the dither cell. The chosen column will be the expected column in the case of perfectly dot-aligned segments, and a neighboring column in the case of misaligned segments. The misalignment is therefore used to determine what the offset into the Common dither cell will be. The limit case of this is that for each segment overlap region there is a different pair of dither matrices one pair for each overlap, taking misalignment and position within the common dither cell into account. There are many ways known in the art by which to generate these dither cells. Generation of dither cells can be done once for each printhead misalignment pair. It can be done once for all printheads. For example, it would be trivial to generate an exhaustive dither cell pair list for all misalignments up to 100th of a dot misalignment. To do so would require generation of 100×64 dither cell pairs, and 100×64 offset values—for a total of 6400 sets. Assuming an overlap of 32 dots and a height of dither cell of 64, 4 KB is required per dither cell pair, for a total of 12.5 MBytes, which could be readily stored on the printer driver's installation CD-ROM (or equivalent). During installation of the printer driver, the correct dither cells are selected based upon the misalignment in the connected printhead, requiring a total of 64 KBytes for a 15-segment printhead. The point here is that the generation of the dither cells need only be done once. The actual 6400 dither cells (assuming alignment is only to a 100th of a dot accuracy) could readily be generated by simulated annealing dither cell generation techniques. The "goodness function" would be a simple dot-gain calculation. The aim of the simulated anneal would be to minimize the dot gain difference compared to the standard dither cell.

Figure 14:
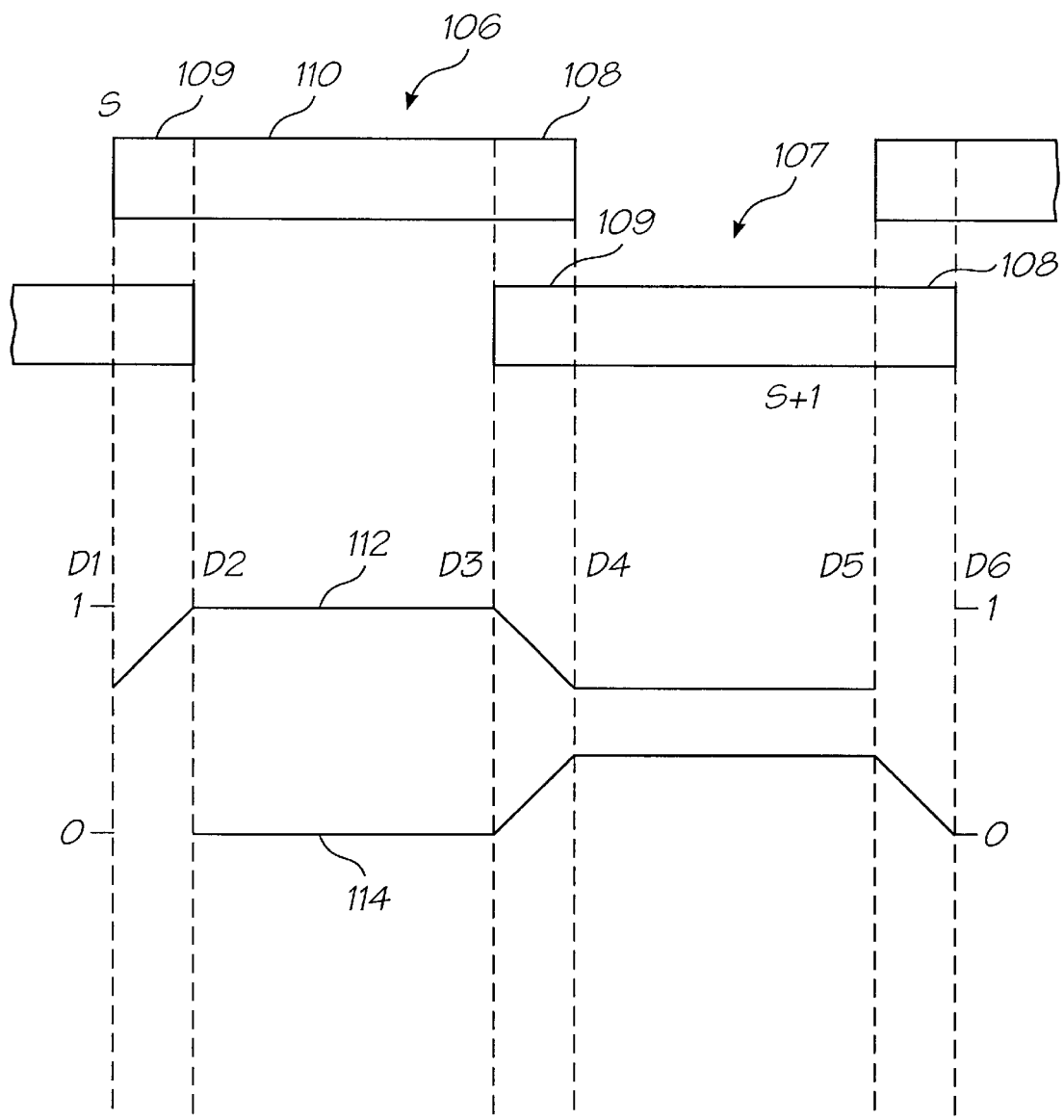
FIG. 14 illustrates the generation of the probability values in each common print area.

In FIG. 14 there is illustrated a method for addressing the problems associated with making a transition between printheads having different characteristics.

As set out in the Background to the Invention, these problems are associated with mach banding. This is a term used for the human eye's tendency to amplify visual differences between contiguous images. In this case the images are created by consecutive printhead segments. As is clear from the above description, each printhead segment has unique charateristics that are represented by the characterization vector referred to above. This characterization vector is made up of, for example average dot size and position of defective nozzles in each printhead segment. As a result of this, the images printed by each printhead segment are subtly different and in the absence of any compensation there is a danger that the human eye will pick up these differences because of the phenomenon known as mach banding.

The present invention uses a principle of interpolation of the characteristics of those printhead segments that have corresponding lead in and lead out areas 109, 108.

The interpolation is carried by generating each lead in/lead out dither matrix based on probablities weighted depending on a position of the relevant dot to be printed.

This is illustrated in FIG. 14, where a particular column of a page is demarcated as being between lines D1 and D6. Assuming that the printhead segment 106 spans D1–D4 and printhead segment spans D3–6, then the lead out area of printhead segment 106 and the lead in area of printhead segment 107 both span D3–D4.

It will be appreciated that for any position d(1,6) between D1 and D6, the probability that the printhead segment 106 will be active can be given a value between 1 and 0, where 1 represents TRUE and 0 represents FALSE. For example, the value is 1 between D2 and D3 and 0 between D4 and D5, as is clear from the drawing. However, for any position d(3,4) between D3 and D4, the value is anywhere between 1 and 0, and will be referred to as x for convenience.

In order to achieve a suitable gradual transition, x is made dependent on the distance of the position d from D3. Broadly, therefore, if linear dimensional values imparted to D1, D2, ... D6, starting from D1, then $$x = d(3,4)/(D4-D3).$$

Thus, the higher the value of x, the more likely it is that the printhead segment 106 will be the active printhead segment. Of course, the lower the value of x, the less likely it is that the printhead segment 106 will be the active printhead segment.

A probabilty line for printhead segment 106 is indicated with reference numeral 112 in FIG. 14. A probability line for printhead segment 107 is indicated with reference numeral 114 in FIG. 14. In particular, the line 114 indicates that the same operation is carried out with the printhead segment 107, to generate a probability value associated with the probability that the printhead segment 107 will be active.

As can be seen, the change in probabilty x is indicated by a sloped line for both printheads 106, 107.

Applicant has found that a distance between D3 and D4 should not be less than 1 mm in order to ensure that the human eye fails to discern a difference between the printing characteristics between D2–D3 and D4–D5.

The mechanisms used to obtain various characteristics of the entire printhead have been described earlier. These characteristics include such details as length of each segment and length of each lead out and lead in areas. It follows that these characteristics can be used to generate the probability values which are then interpolated with the lead-in/lead-out matrices.

Throughout the specification the aim has been to describe the preferred embodiments of the invention without limiting the invention to any one embodiment or specific collection of features. Persons skilled in the art may realize variations from the specific embodiments that will nonetheless fall within the scope of the invention.

What is claimed is:

1. A method of controlling a print engine for a multi-segment printhead having a plurality of printhead segments that are positioned in a printhead to span a print area so that portions of consecutive printhead segments overlap in common print areas, with each printhead segment defining a lead-in area in one common print area and a lead-out area in a consecutive common print area, the method comprising the steps of:

generating a set of dither matrices for each printhead segment, each set having at least a lead-in dither matrix associated with the lead-in area and a lead-out dither matrix associated with the lead-out area;

generating lead-in/lead-out dither matrices for each common print area based on characteristics of the printhead segments of each common print area;

generating a variable probability value that is dependent on a scalar value that corresponds to a position along a line spanning each common print area;

interpolating the lead-in/lead-out dither matrices with the variable probability value to generate interpolated lead-in/lead-out dither matrices;

loading a compositor with the data representing the matrices;

compositing print data based on the dither matrices; and providing the printhead with the print data.

2. A method as claimed in claim 1, which includes the steps of:

querying the printhead segments to generate data in the form of a characterization vector that is unique to the printhead;

loading a memory device with the characterization vector; and reading the characterization vector to carry out the step of generating the lead-in/lead-out dither matrices.

3. A method as claimed in claim 1, which includes the step of generating a dither matrix for a non-overlapping portion of each printhead segment.

4. A print engine controller for a multi-segment printhead having a plurality of printhead segments that are positioned in a printhead to span a print area so that portions of consecutive printhead segments overlap in common print areas, with each printhead segment defining a lead-in area in one common print area and a lead-out area in a consecutive common print area, the print engine controller comprising an interface which is configured to receive image data;

a memory device that is capable of storing data relating to characteristics of the multi-segment printhead;

a dithering unit that communicates with the interface to receive the image data from the interface and the memory device to receive data relating to the characteristics of the multi-segment printhead, the dithering unit being configured to generate a set of dither matrices for each printhead segment so that each set has at least a lead-in dither matrix associated with the lead-in area and a lead-out dither matrix associated with the lead-out area, to generate lead-in/lead-out dither matrices for each common print area based on characteristics of the printhead segments of each common print area, to generate a variable probability value that is dependent on a scalar value that corresponds to a position along a line spanning each common print area and to interpolate the lead-in/lead-out dither matrices with the variable probability value to generate interpolated lead-in/lead-out dither matrices;

a compositor that communicates with the dithering unit to receive data representing the interpolated lead-in/lead-out dither matrices and to composite the data into print data; and a printhead interface that communicates with the compositor to receive the print data, the printhead interface being in communication with the multi-segment printhead to provide the multi-segment printhead with the print data.

5. A print engine controller as claimed in claim 4, in which the dithering unit is configured to generate a dither matrix for each non-overlapping area of the printhead segments.

6. An inkjet printer that comprises a printhead that includes a number of printhead segments that span a print area, the printhead segments being positioned so that portions of consecutive printhead segments overlap in common print areas, with each printhead segment defining a lead-in area in one common print area and a lead-out area in a consecutive common print area;

an interface which is configured to receive image data;

a memory device that is capable of storing data relating to characteristics of the printhead;

a dithering unit that communicates with the interface to receive the image data from the interface and the memory device to receive data relating to the characteristics of the printhead, the dithering unit being configured to generate a set of dither matrices for each printhead segment so that each set has at least a lead-in dither matrix associated with the lead-in area and a lead-out dither matrix associated with the lead-out area, to generate lead-in/lead-out dither matrices for each common print area based on characteristics of the printhead segments of each common print area, to generate a variable probability value that is dependent on a scalar value that corresponds to a position along a line spanning each common print area and to interpolate the lead-in/lead-out dither matrices with the variable probability value to generate interpolated lead-in/lead-out dither matrices;

a compositor that communicates with the dithering unit to receive data representing the interpolated lead-in/lead-out dither matrices and to composite the data into print data; and a printhead interface that communicates with the compositor to receive the print data, the printhead interface being in communication with the printhead to provide the printhead with the print data.

7. A printer as claimed in claim 6 wherein each common print area defined by consecutive printhead segments has a width of at least 1 mm.

* * * * *